US012522009B2

(12) United States Patent
Takei et al.

(10) Patent No.: US 12,522,009 B2
(45) Date of Patent: Jan. 13, 2026

(54) PRINTING APPARATUS AND CONTROL METHOD THEREOF

(71) Applicant: CANON KABUSHIKI KAISHA, Tokyo (JP)

(72) Inventors: Atsushi Takei, Kanagawa (JP); Tetsuya Narazaki, Tokyo (JP); Toshiyuki Chikuma, Tokyo (JP); Hirokazu Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 18/460,447

(22) Filed: Sep. 1, 2023

(65) Prior Publication Data

US 2024/0075736 A1 Mar. 7, 2024

(30) Foreign Application Priority Data

Sep. 5, 2022 (JP) ................................ 2022-140656

(51) Int. Cl.

| | |
|---|---|
| ***B41J 25/34*** | (2006.01) |
| ***B41J 2/045*** | (2006.01) |
| ***B41J 2/165*** | (2006.01) |
| ***B41J 2/175*** | (2006.01) |
| ***B41J 2/21*** | (2006.01) |
| ***B41J 29/17*** | (2006.01) |

(52) U.S. Cl.

CPC ............ *B41J 25/34* (2013.01); *B41J 2/0458* (2013.01); *B41J 2/16508* (2013.01); *B41J 2/16517* (2013.01); *B41J 2/16523* (2013.01); *B41J 2/16532* (2013.01); *B41J 2/175* (2013.01); *B41J 2/17566* (2013.01); *B41J 2/17596* (2013.01); *B41J 2/2103* (2013.01); *B41J 29/17* (2013.01)

(58) Field of Classification Search

CPC ...... B41J 25/34; B41J 2/0458; B41J 2/16508; B41J 2/16517; B41J 2/16523; B41J 2/16532; B41J 2/175; B41J 2/17566; B41J 2/17596; B41J 2/2103; B41J 29/17; B41J 2002/16573; B41J 2/17509; B41J 29/38

See application file for complete search history.

(56) References Cited

U.S. PATENT DOCUMENTS

2022/0258478 A1* 8/2022 Komamiya .......... B41J 2/17566

FOREIGN PATENT DOCUMENTS

JP 2003-341103 A 12/2003

* cited by examiner

*Primary Examiner* — Justin Seo

(74) *Attorney, Agent, or Firm* — Canon U.S.A., Inc. IP Division

(57) ABSTRACT

A printing apparatus includes a mounting unit, a tank, a pump, a detection unit, an obtainment unit, and a control unit. The mounting unit is configured so that a head that ejects ink can be mounted in a replaceable manner. The tank contains ink to be supplied to the head via a tube. The pump discharges ink to an outside of the head. The detection unit detects that the head mounted on the mounting unit has been replaced. The obtainment unit obtains information of a usage history which indicates whether or not the head mounted as a replacement has been used. The control unit controls a discharge operation, which is performed by the pump after head replacement, to be changed based on the information of the usage history.

13 Claims, 26 Drawing Sheets

| | BK INDIVIDUAL SUCTION | | CL INDIVIDUAL SUCTION | |
|---|---|---|---|---|
| | DRIVING AMOUNT (THE NUMBER OF SLITS) | DRIVING SPEED (THE NUMBER OF SLITS/sec) | DRIVING AMOUNT (THE NUMBER OF SLITS) | DRIVING SPEED (THE NUMBER OF SLITS/sec) |
| CLEANING H1 | 10000 | 1000 | 30000 | 1000 |
| CLEANING H2 | 10000 | 1000 | 60000 | 1000 |
| CLEANING H3 | 20000 | 1000 | 30000 | 1000 |
| CLEANING H4 | 20000 | 1000 | 60000 | 1000 |

FIG.11

| | INK CONSUMPTION AMOUNT (g) | | | |
|---|---|---|---|---|
| | BK INDIVIDUAL SUCTION | | CL INDIVIDUAL SUCTION | |
| | BK HEAD | CL HEAD | BK HEAD | CL HEAD |
| CLEANING H1 | 50 | 0 | 0 | 150 |
| CLEANING H2 | 50 | 0 | 0 | 300 |
| CLEANING H3 | 100 | 0 | 0 | 150 |
| CLEANING H4 | 100 | 0 | 0 | 300 |

FIG.12

| | BKCL SIMULTANEOUS SUCTION | | CL INDIVIDUAL SUCTION | |
|---|---|---|---|---|
| | DRIVING AMOUNT (THE NUMBER OF SLITS) | DRIVING SPEED (THE NUMBER OF SLITS/sec) | DRIVING AMOUNT (THE NUMBER OF SLITS) | DRIVING SPEED (THE NUMBER OF SLITS/sec) |
| CLEANING H1 | 10000 | 1000 | 20000 | 1000 |
| CLEANING H2 | 10000 | 1000 | 50000 | 1000 |
| CLEANING H3 | 20000 | 1000 | 10000 | 1000 |
| CLEANING H4 | 20000 | 1000 | 40000 | 1000 |

FIG.16

| | INK CONSUMPTION AMOUNT (g) | | | |
|---|---|---|---|---|
| | BKCL SIMULTANEOUS SUCTION | | CL INDIVIDUAL SUCTION | |
| | BK HEAD | CL HEAD | BK HEAD | CL HEAD |
| CLEANING H1 | 50 | 50 | 0 | 100 |
| CLEANING H2 | 50 | 50 | 0 | 250 |
| CLEANING H3 | 100 | 100 | 0 | 50 |
| CLEANING H4 | 100 | 100 | 0 | 200 |

FIG.17

| FIG.19A |
| --- |
| FIG.19B |

| | BK INDIVIDUAL SUCTION | | CL INDIVIDUAL SUCTION | |
|---|---|---|---|---|
| | DRIVING AMOUNT (THE NUMBER OF SLITS) | DRIVING SPEED (THE NUMBER OF SLITS/sec) | DRIVING AMOUNT (THE NUMBER OF SLITS) | DRIVING SPEED (THE NUMBER OF SLITS/sec) |
| CLEANING H5 | 10000 | 1000 | - | - |
| CLEANING H6 | 20000 | 1000 | - | - |
| CLEANING H7 | - | - | 30000 | 1000 |
| CLEANING H8 | - | - | 60000 | 1000 |

FIG.21

| | INK CONSUMPTION AMOUNT (g) | | | |
|---|---|---|---|---|
| | BK INDIVIDUAL SUCTION | | CL INDIVIDUAL SUCTION | |
| | BK HEAD | CL HEAD | BK HEAD | CL HEAD |
| CLEANING H5 | 50 | 0 | 0 | 0 |
| CLEANING H6 | 100 | 0 | 0 | 0 |
| CLEANING H7 | 0 | 0 | 0 | 150 |
| CLEANING H8 | 0 | 0 | 0 | 300 |

FIG.22

PRINTING APPARATUS AND CONTROL METHOD THEREOF

BACKGROUND

Field

The present disclosure relates to a technology of a suction operation in a printing apparatus.

Description of the Related Art

A printing apparatus equipped with a printing head including ejection ports for ejecting ink and an ink tank capable of containing ink, in which the printing head and the ink tank are connected via a tube, has been known. In such a printing apparatus, air bubbles are generated on the inner wall of the tube as time passes, and the air bubbles flow into the printing head due to printing operations, and thus the amount of ink filling the inside of the printing head gradually decreases, so that an ejection failure occurs in due course. In such a situation, the ejection function can be recovered by executing a recovery operation (cleaning) of the printing head.

Ink is consumed in a case of cleaning the printing head. In the printing apparatus disclosed in Japanese Patent Laid-Open No. 2003-341103 (hereinafter referred to as Document 1), one of the two suction operations with different suction amounts is selected based on the ink remaining amount in the printing head, in order to reduce the ink consumption amount due to the cleaning.

SUMMARY

According to an aspect of the present disclosure, a printing apparatus includes a mounting unit configured so that a head that ejects ink can be mounted in a replaceable manner, a tank configured to contain ink to be supplied to the head via a tube, a pump configured to discharge ink to an outside of the head, a detection unit configured to detect that the head mounted on the mounting unit has been replaced, an obtainment unit configured to obtain information of a usage history which indicates whether or not the head mounted as a replacement has been used, and a control unit configured to control a discharge operation, which is performed by the pump after head replacement, to be changed based on the information of the usage history.

Further features of the present disclosure will become apparent from the following description of exemplary embodiments with reference to the attached drawings.

BRIEF DESCRIPTION OF THE DRAWINGS

FIG. 11 is a diagram illustrating an example of suction parameters for head replacement cleaning;

FIG. 12 is a diagram illustrating the amounts of ink consumed in the head replacement cleaning;

FIG. 16 is a diagram illustrating suction parameters for head replacement cleaning;

FIG. 17 is a diagram illustrating the amounts of ink consumed in the head replacement cleaning;

FIG. 21 is a diagram illustrating suction parameters for head replacement cleaning;

FIG. 22 is a diagram illustrating the amounts of ink consumed in the head replacement cleaning;

DESCRIPTION OF THE EMBODIMENTS

Hereinafter, detailed explanations are given of preferred embodiments of the present disclosure with reference to the accompanying drawings. Not that the following embodiments are not intended to limit the contents of the present disclosure, and every combination of the characteristics explained in the present embodiments is not necessarily essential to the solution in the present disclosure. Note that the same reference numbers are given to the same constituent elements.

First Embodiment

Figure 1:
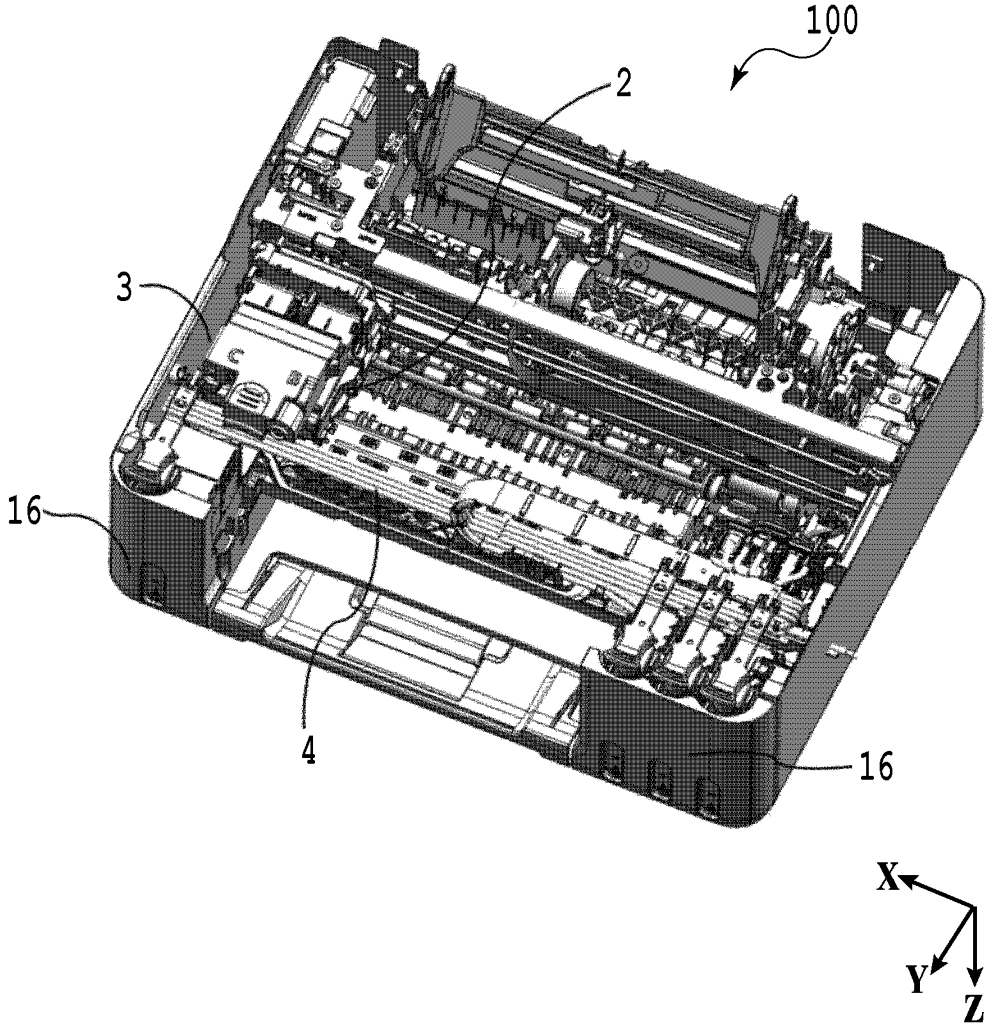
FIG. 1 is a perspective view diagram illustrating the internal configuration of a printing apparatus.

FIG. 1 is a perspective view diagram illustrating the internal configuration of the inkjet printing apparatus 100 (hereinafter also referred to as a printing apparatus) of the present embodiment. The printing head 2 (hereinafter also referred to as a head) that ejects ink droplets is mounted on the carriage 3. The head 2 and the liquid container 16 (ink tank) containing ink are connected via the supply tube 4. Ink is supplied from the liquid container 16 to the head 2 via the supply tube 4. The head 2 of the present embodiment is configured to be capable of ejecting four colors of ink, i.e., black, cyan, magenta, and yellow. Therefore, the four liquid containers 16 are installed, so as to correspond to the four colors.

From the viewpoint of the roles, the respective mechanisms of the printing apparatus 100 in the present embodiment can be classified into a paper feeding unit, a sheet conveying unit, a paper discharge unit, a carriage unit, a cleaning unit, and an exterior unit. Since the present embodiment mainly relates to a suction recovery operation, the following explanations mainly focus on the configurations related to the cleaning unit.

Figure 2:
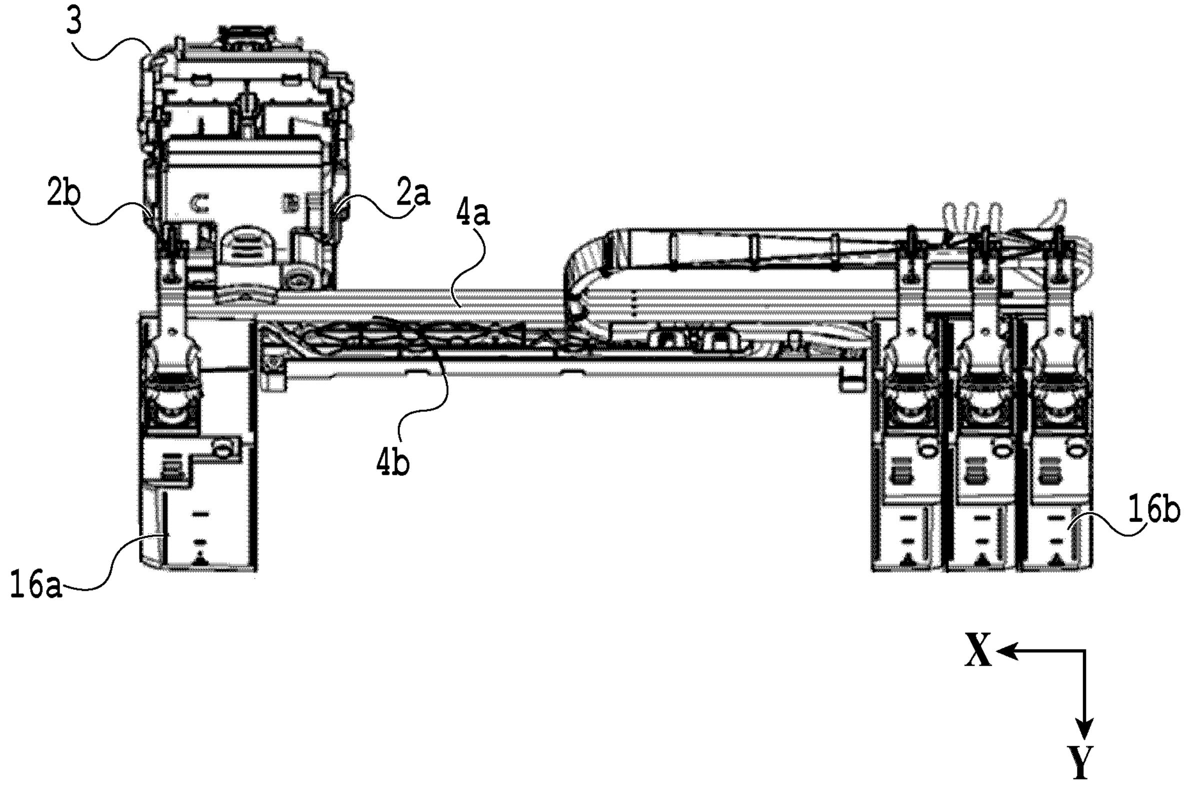
FIG. 2 is a perspective view diagram illustrating an example of a supply mechanism.

FIG. 2 is a perspective view diagram illustrating an example of the supply mechanism of the present embodiment. The supply mechanism includes the head 2, the supply tube 4, and the liquid container 16. The black ink liquid container 16*a* is connected to the black ink head 2*a* (hereinafter also referred to as the BK head) via the BK supply tube 4*a*. The chromatic color ink liquid container 16*b* is connected to the chromatic color ink head 2*b* (hereinafter also referred to as the CL head) via the CL supply tube 4*b*. Note that, as described above, the chromatic color inks include cyan ink, magenta ink, and yellow ink. The head 2 of the present embodiment includes the BK head 2*a* which ejects one color, i.e., black ink, and the CL head 2*b* which ejects three colors, i.e., cyan ink, magenta ink, and yellow ink. Therefore, in detail, the chromatic color ink liquid container 16*b* and the CL supply tube 4*b* are general terms for three of them corresponding to the three colors. The carriage 3 functions as a mounting unit, on which the BK head 2*a* and the CL head 2*b* are mounted in a removable manner. Each of the BK head 2*a* and the CL head 2*b* is equipped with multiple ejection ports for ejecting ink. Further, each ejection port is equipped with an energy generating element that generates energy for ejecting ink.

Figure 3:
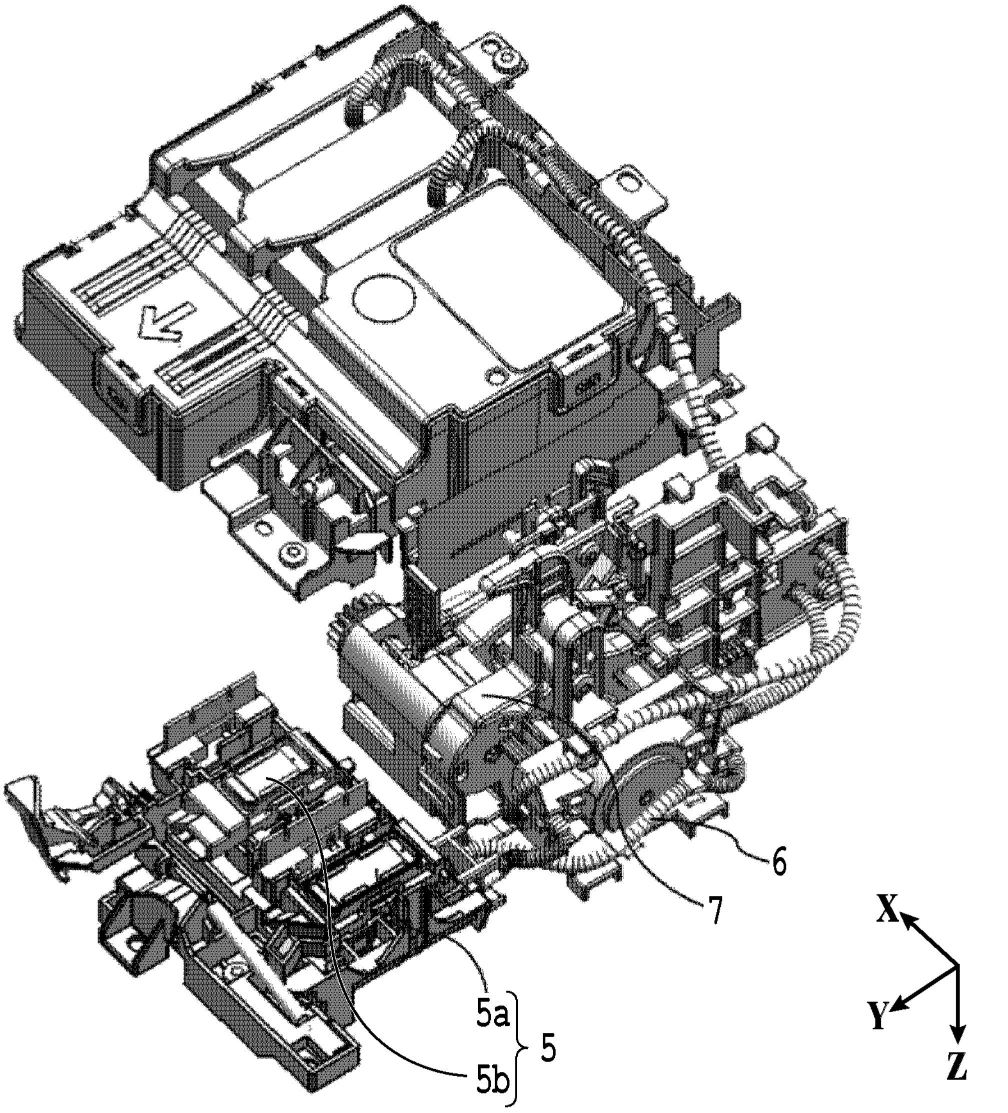
FIG. 3 is a perspective view diagram illustrating an example of a recovery mechanism.

FIG. 3 is a perspective view diagram illustrating an example of the recovery mechanism of the present embodiment. The recovery mechanism includes the cap 5, the suction tube 6, and the suction pump 7. The cap 5 includes the black cap 5*a* for covering the ejection ports of the BK head 2*a* and the color cap 5*b* for covering the ejection ports of the CL head 2*b*. The black cap 5*a* and the color cap 5*b* communicate with the suction pump 7 via the suction tube 6, which is connected to a lower part of the cap 5.

Figure 4:
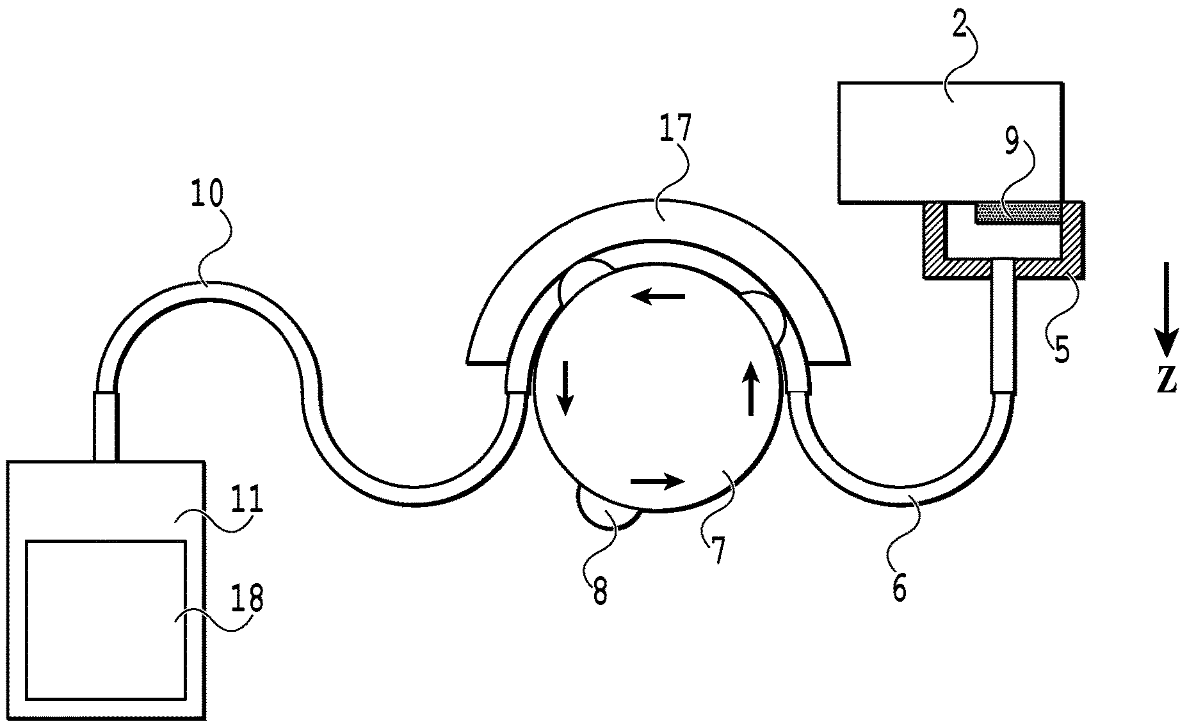
FIG. 4 is a schematic diagram illustrating details of the recovery mechanism.

FIG. 4 is a schematic diagram illustrating details of the recovery mechanism of the present embodiment. By driving the suction pump 7 in the state where the head 2 and the cap 5 are in close contact with each other, the suction operation at the ejection ports of the head 2 is executed. The suction tube 6 is placed between the rollers 8 and the guide 17, which configure the suction pump 7. In the suction pump 7, the suction tube 6 placed between the rollers 8 and the guide 17 is crushed due to the rotation of the shaft in which the rollers 8 are arranged, and the inside of the suction tube 6 is depressurized due to the rotation of the rollers 8. As a result, the head 2 and the cap 5 communicating with the suction tube 6 are also depressurized, and thus a negative pressure is generated, so that ink is thereby suctioned from the ejection ports 9 of the head 2. This suction amount is controlled by the number of rotations and the rotation speed of the rollers 8. Ink that is discharged from the ejection ports 9 by the suction flows into the waste ink tank 11 via the waste ink tube 10. The waste-ink absorber 18 is installed in the waste ink tank 11. With the waste-ink absorber 18, leakage of the waste ink to the outside is suppressed even in a case where the printing apparatus 100 is tilted.

Figure 5:
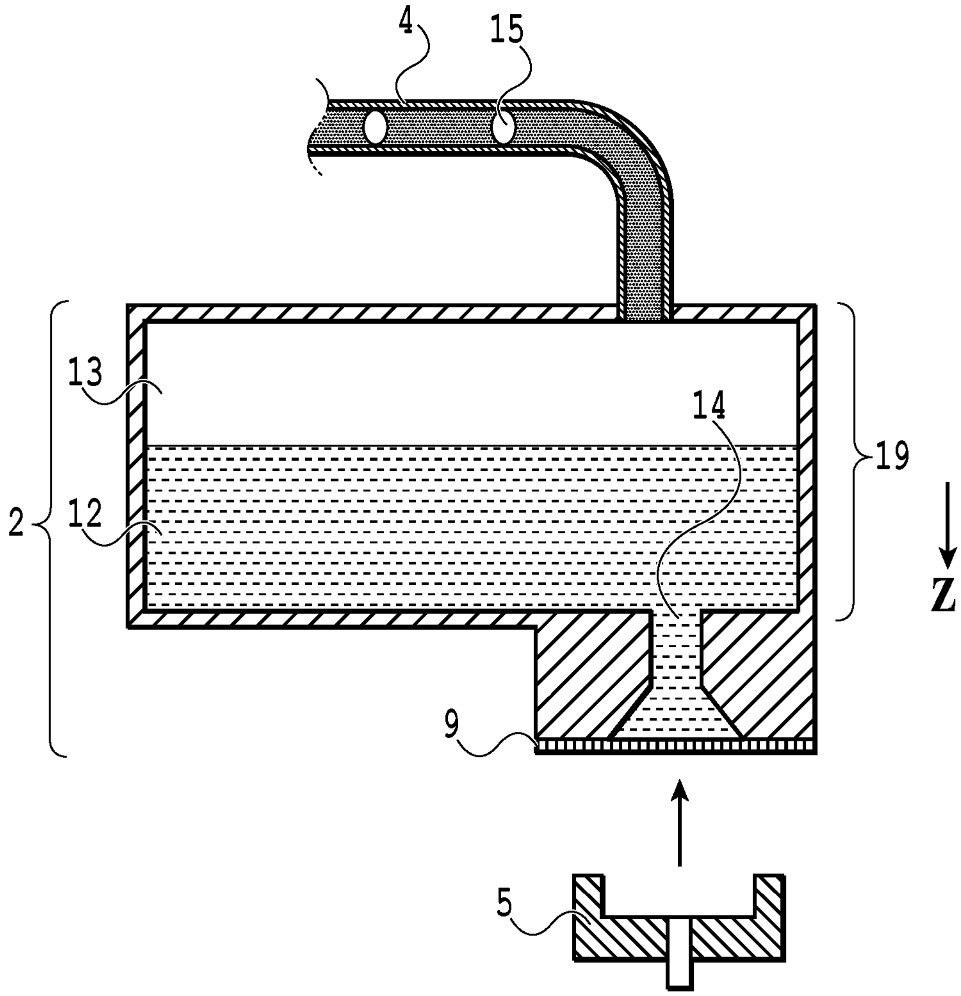
FIG. 5 is a schematic diagram illustrating a head and a cap.

FIG. 5 is a schematic diagram illustrating the head 2 and the cap 5 of the present embodiment. The head 2 of the present embodiment is a head of an ink jet system in which thermal energy is utilized for ejecting ink. The head 2 includes multiple heater boards that generate thermal energy as energy generating elements. The head 2 generates thermal energy by pulse signals applied to the heater boards. This thermal energy causes film boiling inside an ink liquid. Further, the foaming pressure of the film boiling is utilized to eject the ink from ejection ports for printing. The sub tank 19 capable of holding ink is installed integrally with the head 2 in order to prevent the ink supply to the ejection ports 9 from not arriving in time in a case where printing with ink at a high flow rate is performed. The absorber 12 is installed inside the sub tank 19. The absorber 12 is configured to be capable of internally holding ink. The air layer 13 exists above the absorber 12. The liquid chamber 14 is installed below the absorber 12. The ejection port 9 is adjoined to the lower part of the liquid chamber 14.

The supply tube 4 is preferably always filled with ink. The supply tube 4 used for connecting the liquid container 16 and the sub tank 19 is made of rubber or resin with flexibility. Therefore, the supply tube 4 has some gas transmission property. Further, since the inside of the supply tube 4 has the negative pressure at the same level as that of the head 2, air enters the inside of the supply tube 4 little by little from the atmosphere through the tube wall, and thus air bubbles may be generated, for example, after being uncontrolled for a long period of time. Furthermore, in a case where the liquid container 16 is replaced, air bubbles enter the supply tube 4 as well. Moreover, if the air bubbles flow into the head 2, there is a possibility that normal ejection cannot be performed. Further, as the amount of air in the supply tube 4 increases, more air may enter the inside of the supply tube 4. Therefore, it is preferable that the supply tube 4 is always filled with ink.

The printing apparatus 100 is configured to be capable of executing a suction recovery operation for the purpose of discharging ink solidified in the vicinity of the ejection ports 9, removing air bubbles in the supply tube 4 and the head 2, filling the head 2 and the supply tube 4 with ink, etc. The suction recovery operation is performed by use of the recovery mechanism explained with reference to FIG. 4. Examples of a condition that requires the suction recovery operation include a case where the ink adhering to the surface of the ejection ports 9 evaporates and gets solidified, a case where a certain period of time has elapsed since the previous suction recovery operation, a case where air bubbles have flowed into the supply tube 4 and the head 2, at the time of head replacement, etc.

If the air bubble 15 flows into the supply tube 4, the air bubble 15 in the supply tube 4 flows into the head 2 due to a printing operation. If air bubbles flow into the head 2, the amount of ink held in the absorber 12 decreases. Further, if the air bubble 15 finally flows into the ejection port 9, all the ink in the head 2 is replaced with air bubbles, and ejection failure in which ejection is not normally performed occurs. In this case, it is necessary to perform suction for refilling the inside of the absorber 12 with ink to recover from the ejection failure. This is the suction recovery operation performed in a case where air bubbles flow into the supply tube 4 and the head 2.

The suction recovery operation is also performed at the time of head replacement. If the head 2 is detached from the carriage in the present embodiment, both the BK head 2*a* and the CL head 2*b* are simultaneously released to the atmosphere. Further, due to the water head difference, the ink that the supply tube 4 had been filled with retreats to the liquid container 16, and air flows into the supply tube 4. Therefore, even for replacing either the BK head 2*a* or the CL head 2*b*, suction is executed for both the BK head 2*a* and the CL head 2*b*. This is because, as described above, the supply tube 4 is preferably always filled with ink.

Figure 6A:
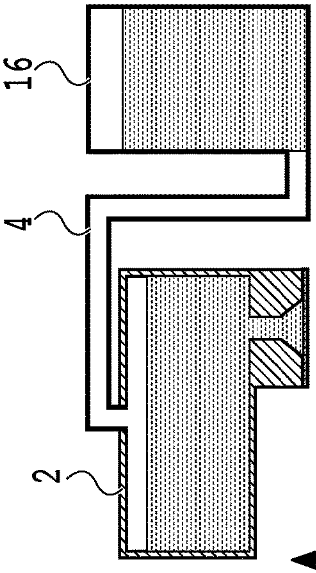
FIG. 6A to FIG. 6E are schematic diagrams illustrating an example of replacement of the head.
Figure 6B:
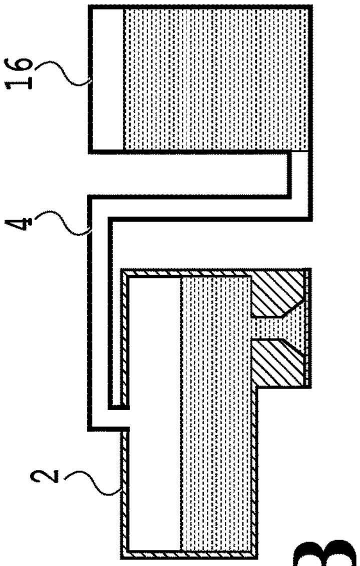
Figure 6C:
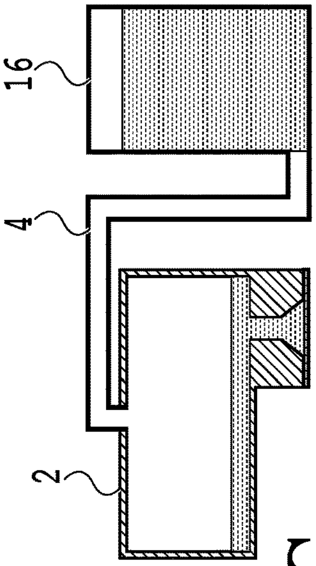

FIG. 6A to FIG. 6E are schematic diagrams illustrating an example of replacing the head 2 of the present embodiment. FIG. 6A to FIG. 6C are schematic diagrams illustrating a state in which the head 2 that had been mounted is detached and the new head 2 is mounted. Note that, by detaching the head 2, the ink that the supply tube 4 had been filled with retreats to the liquid container 16, and air has flowed into the supply tube 4, as described above. Note that the head 2 may be replaced with an unused head with no usage history or with a used head with a usage history.

FIG. 6A is a schematic diagram of a case where the head 2 with no usage history is attached to the supply tube 4. Note that the ink remaining amount in the head 2 is larger than the amount of air that can be accommodated in the supply tube 4. FIG. 6B is a schematic diagram of a case where the head 2 with a usage history is attached to the supply tube 4. In the case of FIG. 6B, the ink remaining amount in the head 2 is also larger than the amount of air that can be accommodated in the supply tube 4. FIG. 6C is a schematic diagram of a case where the head 2 with a usage history is attached to the supply tube 4. In FIG. 6C, the ink remaining amount in the head 2 is less than the amount of air that can be accommodated in the supply tube 4.

Figure 6D:
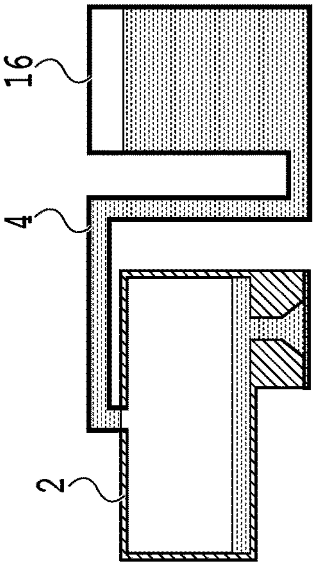
Figure 6E:
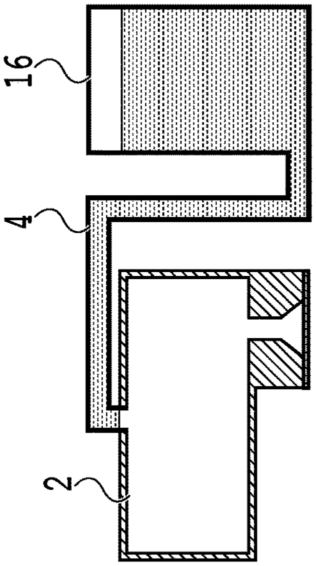

If printing is continued in the state of the head of FIG. 6A and FIG. 6B, the air in the supply tube 4 flows into the head 2. Due to the inflow of the air, the ink held in the absorber 12 in the head 2 is replaced with the air as described above. Accordingly, the amount of ink held in the absorber 12 decreases, and thus the ink remaining amount in the head 2 decreases. Here, the ink remaining amount in the head 2 of FIG. 6A and FIG. 6B is larger than the amount of air that can be accommodated in the supply tube 4. Therefore, even if all the air in the supply tube 4 flows into the head 2, ink remains in the absorber 12 as illustrated in FIG. 6D, and thus no ejection failure occurs.

On the other hand, if printing is continued in the state of the head 2 of FIG. 6C, the air in the supply tube 4 flows into the head 2 and the ink in the head 2 is replaced with the air, and thus an ejection failure occurs. Therefore, in order to prevent ejection failures from occurring, it is required to fill the head 2 and the supply tube 4 with ink by performing suction after the head 2 is replaced. Note that, in the case of FIG. 6A and FIG. 6B, even if printing is continued without performing suction after the head 2 is replaced, ejection failure does not occur immediately. However, as described above, it is preferable that the inside of the supply tube 4 is filled with ink. Therefore, in a case where the head 2 is replaced, suction for ink filling is performed. Here, in the case of FIG. 6A and FIG. 6B, it is preferable to perform suction at a suction amount that fills the inside of the supply tube 4 with ink. On the other hand, in the case of FIG. 6C, it is preferable to perform suction at a suction amount that fills both the head 2 and the supply tube 4 with ink. Accordingly, the consumption amount of ink consumed by the suction recovery operation at the time of head replacement is reduced, so that an appropriate recovery operation is performed. Details are described hereinafter.

Figure 7:
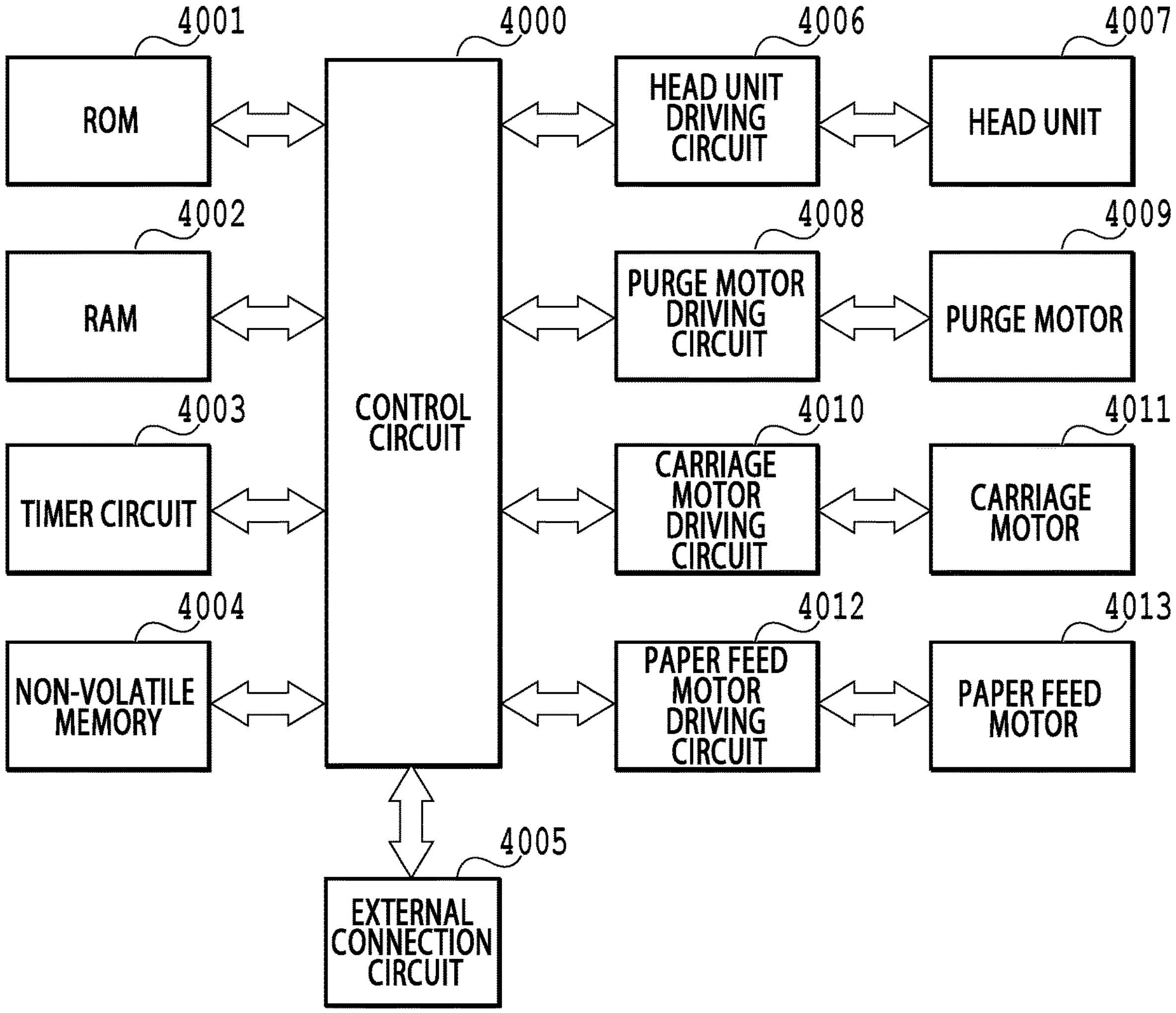
FIG. 7 is a block diagram illustrating the control configuration of the printing apparatus.

FIG. 7 is a block diagram illustrating an example of a configuration for controlling the printing apparatus 100 of the present embodiment. The read-only memory (ROM) 4001 stores control programs to be executed and various setting values for control. The read-only memory (RAM) 4002 loads a control program for executing the control program, stores printing data and control commands, and stores control variables in each control. The timer circuit 4003 is a circuit capable of obtaining the current time or a circuit capable of measuring elapsed time. The non-volatile memory 4004 is a storage device that can store parameters stored during control even in a state where the power source of the main body is turned off. The control circuit 4000 executes a control program stored in the ROM 4001 or a control program loaded into the RAM 4002. The control circuit 4000 is a processor such as a CPU, for example.

The external connection circuit 4005 is an interface for wired or wireless communication with an external host apparatus and is a circuit that allows the control circuit 4000 to handle signals from the host apparatus as control signals. Data of an image to be printed is received from a host apparatus via the external connection circuit 4005 and is input to the printing apparatus 100.

The control circuit 4000 loads the received image data into the RAM 4002. The control circuit 4000 controls driving of the head 2 via the head unit driving circuit 4006, based on the data loaded into the RAM 4002. Further, the control circuit 4000 controls the carriage motor 4011 via the carriage motor driving circuit 4010. One printing scan is executed by ejecting ink to a desired position on the printing medium under the control of the control circuit 4000. The control circuit 4000 controls the paper feed motor 4013 via the paper feed motor driving circuit 4012 to convey the printing medium by a desired amount.

Further, the suction recovery operation in the present embodiment is performed by the control circuit 4000 controlling the purge motor 4009 via the purge motor driving circuit 4008. The suction pump 7 is driven by the purge motor 4009. A desired amount of ink can be suctioned from the head 2 by the control circuit 4000 controlling the purge motor 4009 via the purge motor driving circuit 4008. Further, as a recovery operation, there is a preliminary ejection operation for performing ejection that is not used for printing. The preliminary ejection operation is an operation of performing ejection onto a predetermined position not used for printing (on the cap 5 in this case), not on the printing medium. In the ink ejection performed onto the cap 5, a desired amount of ink is discharged by the control circuit 4000 controlling the driving of the head unit 4007 via the head unit driving circuit 4006. In this case, as in the printing operation, the pattern for driving the head 2 is based on either the data loaded into the RAM 4002, the data in the ROM 4001, or the data generated by the control circuit 4000.

Figures 8, 8A:
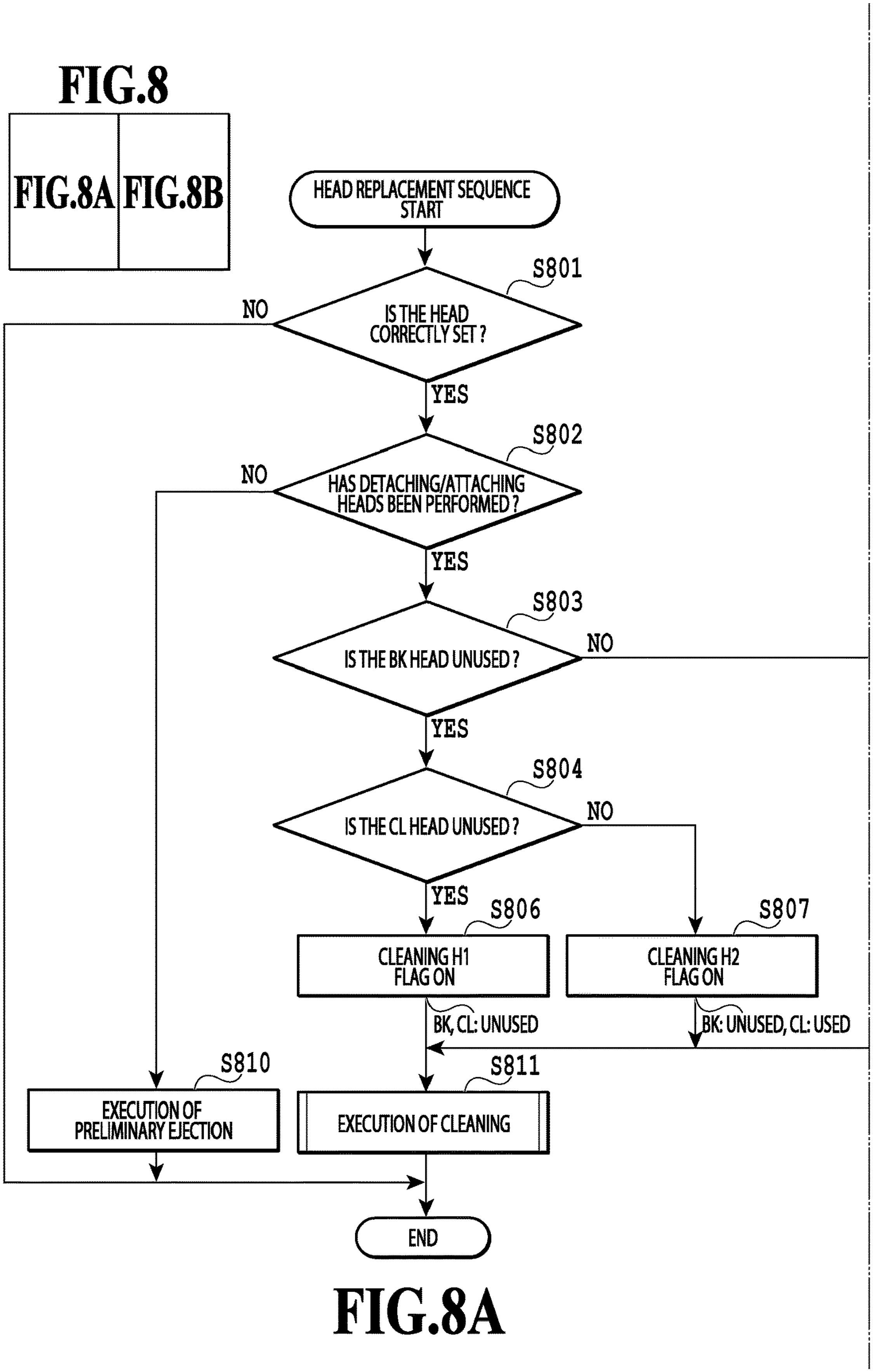
FIG. 8 is a diagram showing the relationship of FIGS. 8A and 8B.
FIGS. 8A and 8B are totally a flowchart illustrating a sequence in head replacement.
Figure 8B:
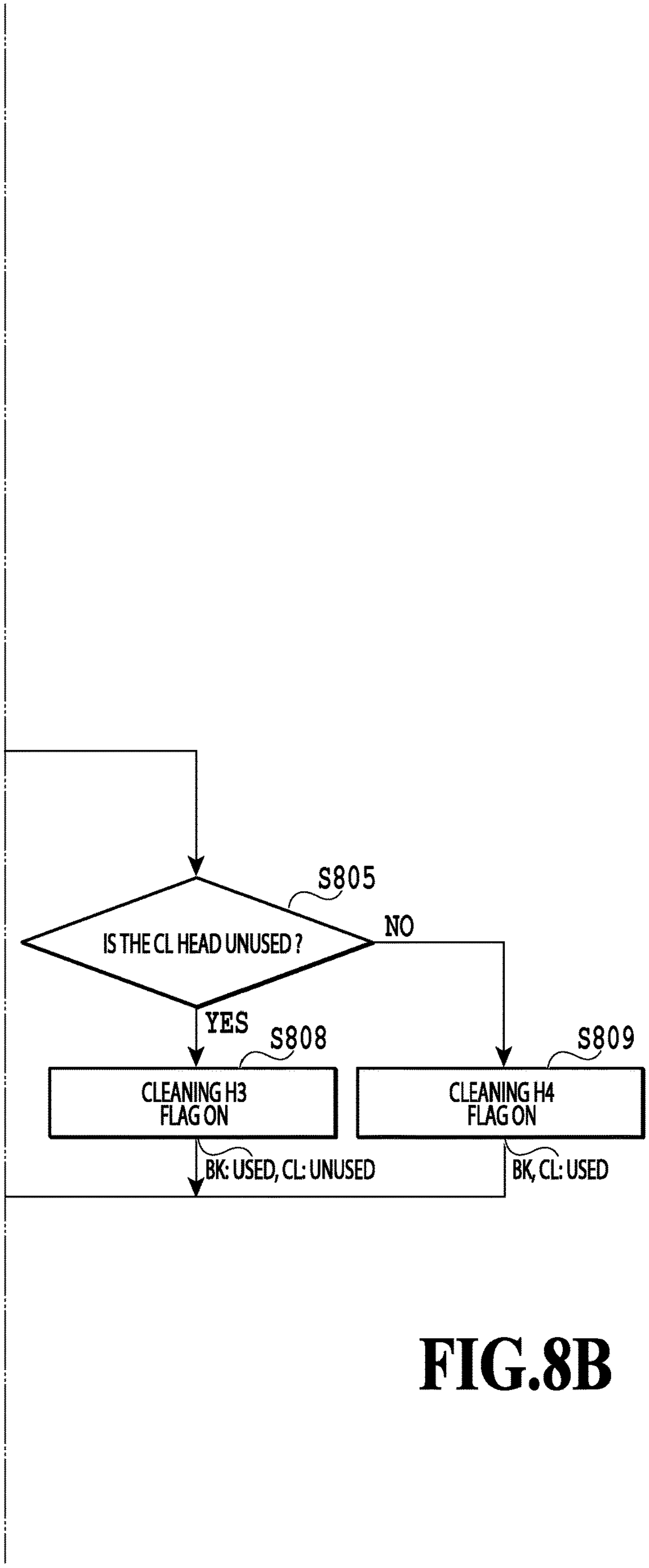

FIGS. 8A and 8B are totally a flowchart illustrating the sequence at the time of head replacement in the present embodiment. The processing illustrated in FIGS. 8A and 8B is processing to be executed in a case where the printing apparatus 100 transitions to the head replacement mode. The transition to the head replacement mode may be triggered by a user's operation using an operation panel, which is not illustrated in the drawings, or may be triggered by opening the cover of the main body. After transitioning to the head replacement sequence, the carriage 3 moves from the standby position to the head replacement position. In FIGS. 8A and 8B, the processing to be performed after the carriage 3 moves to the head replacement position is illustrated. The processing illustrated in FIGS. 8A and 8B is implemented by the control circuit 4000 loading a control program stored in the ROM into the RAM 4002 and the control circuit 4000 executing the loaded control program.

In S801, the control circuit 4000 determines whether the head 2 is correctly set (mounted) on the carriage 3. For example, the determination is made based on whether or not a contact pad installed on the head 2 can be detected by the control circuit 4000. In a case where the head 2 is not correctly mounted on the carriage 3, the processing ends. In a case where the head 2 is correctly mounted on the carriage 3, the processing proceeds to S802.

In S802, the control circuit 4000 determines whether detaching/attaching the heads 2 has been performed. The control circuit 4000 periodically checks the mounting state of the head 2 so as to detect that the head 2 has been detached, and, thereafter, in a case where it is further detected that the head 2 is mounted, it is determined that detaching/attaching the heads 2 has been performed. Further, in a case where it is detected that the head 2 has been mounted in the initial state or the like where the head was not mounted, it is determined that detaching/attaching the heads 2 has been performed. In a case where detaching/attaching the heads 2 has been performed, the processing proceeds to S803, and, in a case where detaching/attaching the heads 2 has not been performed, the processing proceeds to S810. The determination in S802 is made at a timing where a user's operation is completed, such as in a case where the main body cover is closed. In S810, the control circuit 4000 performs preliminary ejection and ends the processing. The case where the processing proceeds to S810 is the case where the head replacement sequence was executed but the head has not been replaced. Even in a case where the head has not been replaced, the ejection ports 9 are exposed to the air because the head 2 has moved to the head replacement position. In this state, there is a possibility that the ink in the vicinity of the ejection ports 9 drys and gets solidified, and thus preliminary ejection is performed even in a case where the head 2 has not been replaced.

In S803 to S805, the control circuit 4000 determines whether the head 2 is unused. Specifically, in S803, whether the BK head 2*a* is unused is determined. If the BK head 2*a* is unused, the processing proceeds to S804, and, if the BK head 2*a* is not unused (that is, has been used), the processing proceeds to S805. In S804, the control circuit 4000 determines whether the CL head 2*b* is unused. If the CL head 2*b* is unused, the processing proceeds to S806, and, if the CL head 2*b* is not unused, the processing proceeds to S807. In S805, the control circuit determines whether the CL head 2*b* is unused. If the CL head 2*b* is unused, the processing proceeds to S808, and, if the CL head 2*b* is not unused, the processing proceeds to S809. That is, if both the BK head 2*a* and the CL head 2*b* are unused heads, the processing proceeds to S806. If the BK head 2*a* is unused and the CL head 2*b* has been used, the processing proceeds to S807. If the BK head 2*a* has been used and the CL head 2*b* is unused, the processing proceeds to S808. If both the BK head 2*a* and the CL head 2*b* have been used, the processing proceeds to S809.

The head 2 of the present embodiment includes a non-volatile memory, which is not illustrated in the drawings, on the inside thereof. The non-volatile memory in the head stores information related to individual differences of heads, for example. For example, the heating conditions of the heater boards or the like are stored. From S803 to S805, the control circuit 4000 determines whether the attached head 2 is unused or has been used by checking the history of writing to the non-volatile memory in this head. For example, in a case where nothing is written in the non-volatile memory in the head, it is determined that the head 2 is unused. Note that the non-volatile memory in the head may include information indicating whether or not the head has been used, and the determination may be made by referring to this information. In addition, information on a usage history indicating whether the head 2 is unused or has been used may be obtained from given information stored in the non-volatile memory in the head.

For example, in a case where both the BK head 2*a* and the CL head 2*b* are out of order and both heads are replaced, the attached BK head 2*a* and CL head 2*b* are both unused heads. In this case, the control circuit 4000 sets a flag of the cleaning H1 in S806. In a case where the BK head is out of order and only the BK head 2*a* is replaced, the BK head 2*a* is unused and the CL head 2*b* is a head that has been used. In this case, a flag of the cleaning H2 is set in S807. In a case where the CL head 2*b* is out of order and only the CL head 2*b* is replaced, the BK head 2*a* has been used and the CL head 2*b* is an unused head. In this case, a flag of the cleaning H3 is set in S808. In a case where the heads 2 are detached from the carriage 3 but the same heads are attached again, both the BK head 2*a* and the CL head 2*b* have been used. In this case, a flag of the cleaning H4 is set in S809. The flags of S806 to S809 are stored in the RAM 4002 or the non-volatile memory 4004, for example. After one of the processes of S806 to S809 is performed, the processing proceeds to S811.

In S811, the control circuit 4000 executes the cleaning according to the flag. Then, the processing of the present flowchart ends. Note that, in the processing of FIGS. 8A and 8B, preliminary ejection is not performed in a case where the cleaning operation is performed. In the cleaning operation, a suction recovery operation is performed as described hereinafter. The amount of recovery is greater in the suction recovery operation than in the preliminary ejection operation. Therefore, in the present embodiment, in a case where the cleaning operation is executed in S811, the preliminary ejection operation is not performed.

Figure 9:
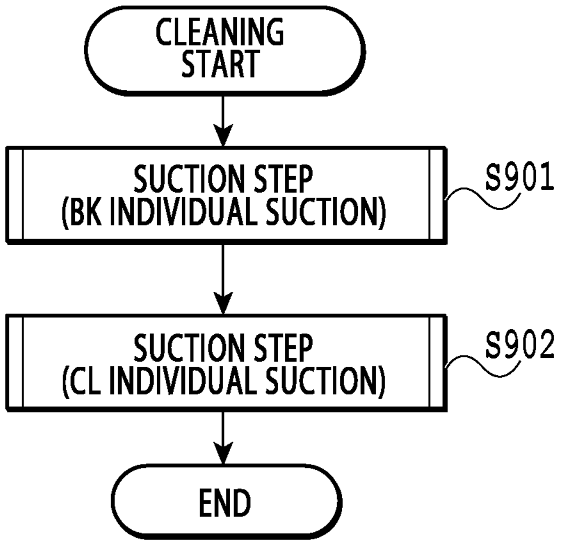
FIG. 9 is a flowchart illustrating a cleaning sequence.

FIG. 9 is a flowchart illustrating the cleaning sequence in the present embodiment. That is, FIG. 9 is a flowchart illustrating the details of the cleaning operation in S811. As the suction methods of the present embodiment, there are two types, i.e., BK individual suction and CL individual suction. As described above, in the present embodiment, in a case where either one of the heads is replaced, suction is performed on both heads including the head that is not replaced. First, in S901, the control circuit 4000 performs the BK individual suction. Subsequently, in S902, the control circuit 4000 performs the CL individual suction. Note that the order may be reversed.

Figure 10:
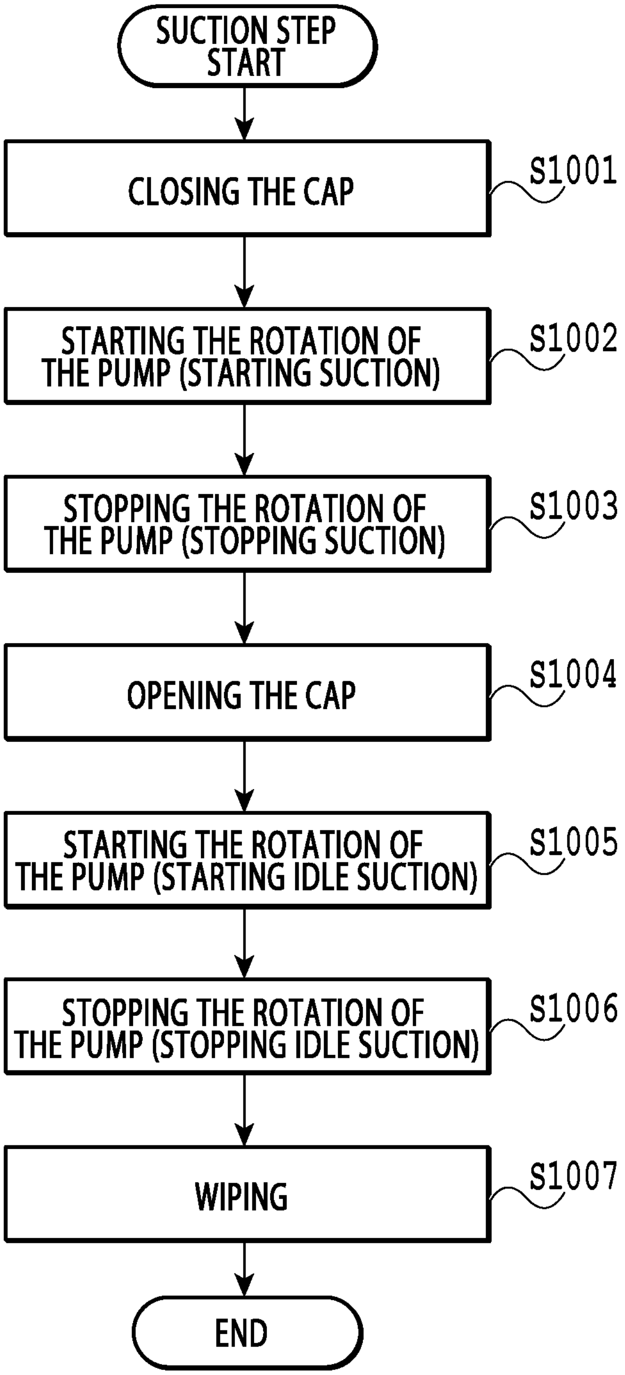
FIG. 10 is a flowchart illustrating a suction step.

FIG. 10 is a flowchart illustrating the suction steps of the present embodiment. That is, FIG. 10 is a flowchart illustrating the details of the suction steps performed in S901 and S902.

In S1001, the control circuit 4000 performs a cap closing process to bring the cap 5 into close contact with the ejection port surface of the head 2. Next, in S1002, the control circuit 4000 starts pump rotation of the suction pump 7 and starts suction. In S1002, after the pump rotation is performed at the predetermined number of rotations corresponding to the above-described flag, the pump rotation is stopped in S1003, and the suction ends. Details of the present processes are described hereinafter.

Next, in S1004, the control circuit 4000 performs a cap opening process to separate the cap 5 from the ejection port surface. Accordingly, the inside of the head 2 is released to the atmosphere. Next, in S1005, the control circuit 4000 rotates the suction pump 7 again to perform idle suction to discharge the ink remaining in the cap 5. The idle suction is to perform suction without capping. After performing the suction of the predetermined number of rotations, in S1006, the control circuit 4000 stops the pump rotation and stops the idle suction. Next, in S1007, the control circuit 4000 performs wiping of the ejection port surface. Note that the wiping is performed by driving a wiper installed in the recovery mechanism.

FIG. 11 is a diagram illustrating an example of suction parameters for head replacement cleaning in the present embodiment. That is, in FIG. 11, an example of suction parameters used in the suction operation performed in S1002 is illustrated. The suction parameters illustrated in FIG. 11 are stored in the ROM 4001, the non-volatile memory 4004, or the like. In the present embodiment, the rotation amount of the suction pump 7 is indicated by a driving amount of the suction pump. The numbers of slits, which are the operating resolutions of the suction pump 7, are shown as the driving amounts. Further, driving speeds are also shown as parameters that affect the suction force. The number of slits/sec is illustrated as a driving speed.

As illustrated in FIG. 11, the driving amounts and driving speeds are defined for each of the BK individual suction and the CL individual suction, so as to correspond to the four flags, i.e., the cleaning H1 to H4, respectively. The flags of the cleaning H1 to H4 are flags that specify a combination of information of the usage history of each of the BK head (first head) and the CL head (second head). As illustrated in FIG. 11, in the BK individual suction of the cleaning H1 and H2, which correspond to the case where the BK head 2*a* is unused, the driving amounts are set to 10000 for the ink filling to the BK supply tube 4*a*. On the other hand, in the BK individual suction of the cleaning H3 and H4, which correspond to the case where the BK head 2*a* has been used, the driving amounts are set to 20000 for the ink filling to the BK head 2*a* and the BK supply tube 4*a*. That is, since the ink filling to both the BK head 2*a* and the BK supply tube 4*a* is performed in the case where the BK head 2*a* has been used, the driving amounts are higher than in the case where the BK head 2*a* is unused, in which the ink filling to the BK head 2*a* is performed.

Similarly, in the CL individual suction of the cleaning H1 and H3, which correspond to the case where the CL head 2*b* is unused, the driving amounts are set to 30000 for the ink filling to the CL supply tube 4*b*. Note that, regarding the CL head 2*b*, the three colors of ink are included in one head, and thus the volume of the CL supply tube 4*b* is larger than that of the BK supply tube 4*a*. Therefore, the driving amount for filling the CL supply tube 4*b* with ink is set to a larger value than the driving amount for filling the BK supply tube 4*a* with ink. In the CL individual suction of the cleaning H2 and H4, which correspond to the case where the CL head 2*b* has been used, the driving amounts are set to 60000 for the ink filling to the CL head 2*b* and the CL supply tube 4*b*. Note that, in the example of FIG. 11, both the BK individual suction and the CL individual suction have a constant driving speed of 1000 and have different driving amounts.

FIG. 12 is a diagram illustrating the amounts of ink consumed in head replacement cleaning in the present embodiment. FIG. 12 corresponds to the ink consumption amounts in the cases where suction is executed with the driving amounts illustrated in FIG. 11. Therefore, there is a correlation between the driving amounts of FIG. 11 and the ink consumption amounts of FIG. 12. In the BK individual suction of the cleaning H1 and H2, the consumption amounts are set to 50 g for the ink filling to the BK supply tube 4*a*. In the BK individual suction of the cleaning H3 and H4, the ink consumption amounts are set to 100 g for the ink filling to both the BK head 2*a* and the BK supply tube 4*a*. Similarly, in the CL individual suction of the cleaning H1 and H3, the ink consumption amounts are set to 150 g for the ink filling to the CL supply tube 4*b*. In the CL individual suction of the cleaning H2 and H4, the ink consumption amounts are set to 300 g for the ink filling to both the CL head 2*b* and the CL supply tube 4*b*. Note that g herein used as a unit is for explaining the relationship between the relative amounts in each head replacement cleaning, and absolute amounts are also typical values. Further, the ink consumption amounts referred to herein indicate the amounts of ink consumed from the liquid container 16, not the amounts of ink discharged from the head 2. Further, in the case of the CL head 2*b*, the total consumption amount of each ink is indicated.

Figure 13:
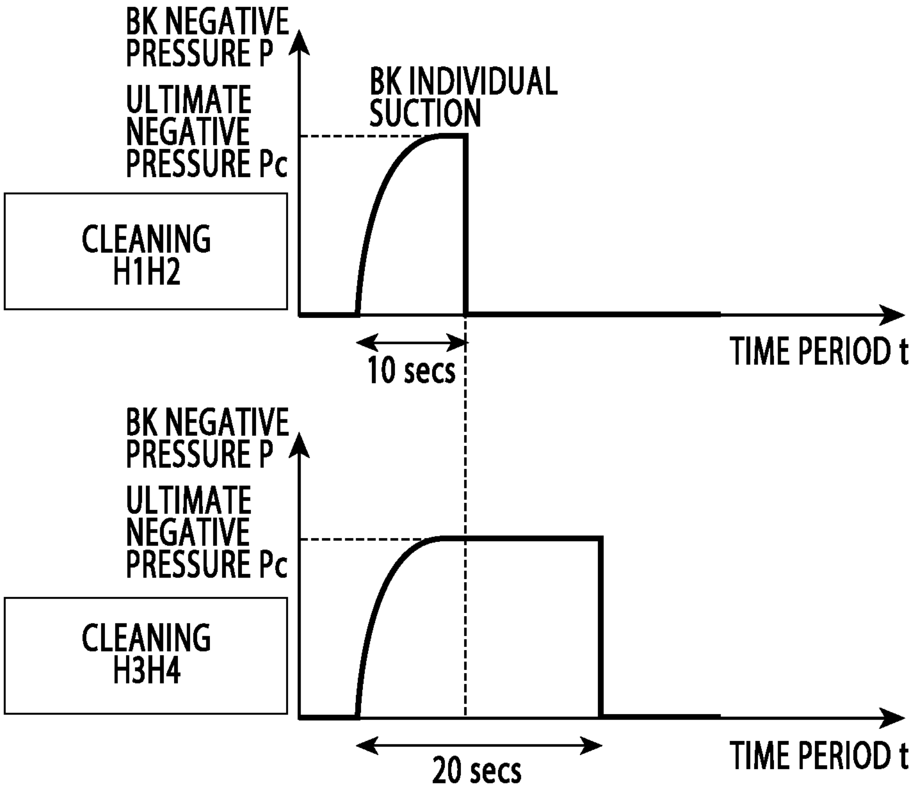
FIG. 13 is a schematic diagram of negative pressure profiles during the head replacement cleaning.

FIG. 13 is a schematic diagram of the negative pressure profiles in the capped state of the BK head 2*a* during head replacement cleaning in the present embodiment. Since the driving speeds of the cleaning H1, H2, H3, and H4 are all constant at 1000, there is no difference in the ultimate negative pressures. In the BK head 2*a*, the driving amounts in the cleaning H1 and H2 are less than those of the cleaning H3 and H4. Therefore, the driving time periods of the cleaning H1 and H2 are shorter than the driving time periods of the cleaning H3 and H4.

Figure 14:
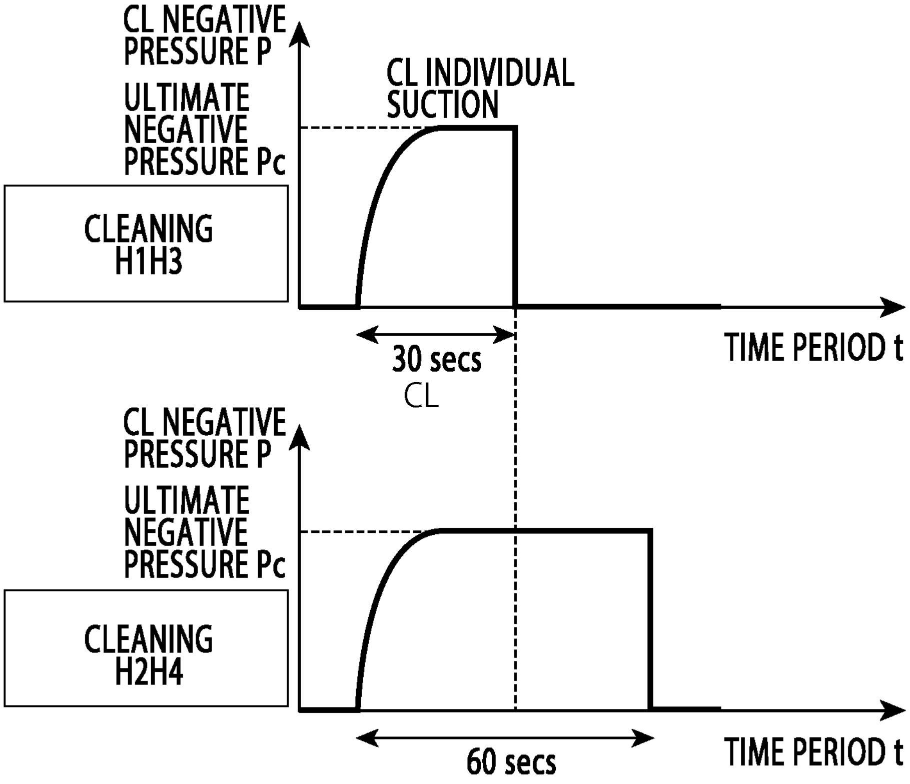
FIG. 14 is a schematic diagram of negative pressure profiles during the head replacement cleaning.

FIG. 14 is a schematic diagram of the negative pressure profiles in the capped state of the CL head 2*b* during head replacement cleaning in the present embodiment. Since the driving speeds of the cleaning H1, H2, H3, and H4 are all constant at 1000, there is no difference in the ultimate negative pressures. In the CL head 2*b*, the driving amounts in the cleaning H1 and H3 are less than those of the cleaning H2 and H4. Therefore, the driving time periods of the cleaning H1 and H3 are shorter than the driving time periods of the cleaning H2 and H4.

As explained above, according to the present embodiment, it is possible to appropriately perform the suction recovery operation at the time of replacing a printing head. That is, in the present embodiment, the supply tube 4 communicating with the head 2 is released to the atmosphere by detaching the head 2, and thereby air bubbles flow into the supply tube 4. Here, control to change the suction amount, based on the usage history of the head mounted as the replacement, is performed. Specifically, in a case where the head is unused, suction is performed with a smaller suction amount, compare to the case where the head has been used. Accordingly, it is possible to reduce the ink consumption amount during head replacement. That is, since the amount of ink consumed from the liquid container 16 is reduced, as a result, the consumption amount of ink discharged from the head 2 during the suction recovery operation can be reduced.

Further, in the control performed in the present embodiment, the remaining amount in a head is estimated from the usage history of the head mounted as the replacement (that is, newly attached) without using a remaining amount detection pin or the like for detecting the ink remaining amount in the head. Therefore, it is possible to perform the suction recovery operation with an appropriate suction amount without using a remaining amount detection pin or the like, and thus the cost can be reduced.

Second Embodiment

In the example explained in the first embodiment, in a case where the head 2 is capped with the cap 5, one of the BK head 2*a* and the CL head 2*b* can be selectively suctioned. In the present embodiment, an explanation is given of an example of the form in which, in a case where the head 2 is capped with the cap 5, the BK head 2*a* and the CL head 2*b* can be suctioned simultaneously. Since the basic configuration of the apparatus and the head replacement sequence are the same as the example explained in the first embodiment, the explanation thereof is omitted here. Hereinafter, an explanation is given mainly of the points different from the first embodiment.

Figure 15:
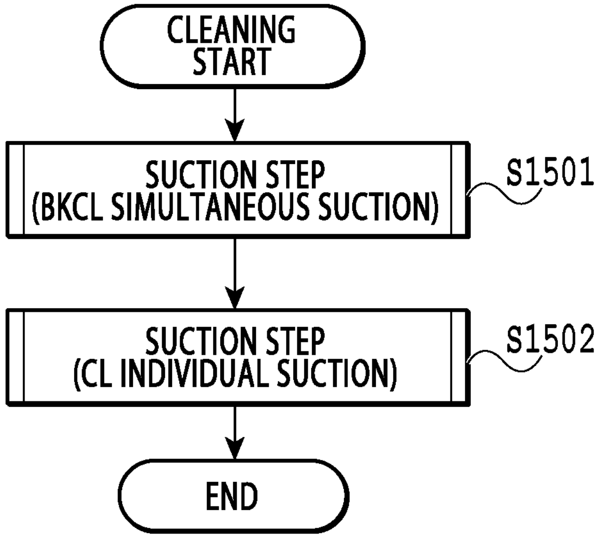
FIG. 15 is a flowchart illustrating a cleaning sequence.

FIG. 15 is a flowchart illustrating the cleaning sequence in the present embodiment. FIG. 15 is a flowchart illustrating the details of the execution of the cleaning in S811 as in the first embodiment. As the suction methods of the present embodiment, there are two types, i.e., BKCL simultaneous suction and CL individual suction. As described above, the BKCL simultaneous suction is an operation of simultaneously suctioning both the BK head 2*a* and the CL head 2*b*.

In the present embodiment, in S1501, the control circuit 4000 performs the BKCL simultaneous suction. Next, in S1502, the control circuit 4000 performs the CL individual suction. The operation in each suction is the same as the example explained in FIG. 10. In the present embodiment, the CL head 2*b* can also be suctioned at the time of the BKCL simultaneous suction. Therefore, it is possible to reduce the driving amount of the CL individual suction. Accordingly, the time period required for head replacement cleaning can be shortened. In the BKCL simultaneous suction, the necessary suction is performed for the BK supply tube 4*a*, or the necessary suction is performed for both the BK head 2*a* and the BK supply tube 4*a*.

FIG. 16 is a diagram illustrating suction parameters for head replacement cleaning in the present embodiment. In the BKCL simultaneous suction of the cleaning H1 and H2, the driving amounts are set to 10000, so as to correspond to the ink filling to the BK supply tube 4*a*. Note that the driving amounts indicate the values corresponding to the driving amounts explained in FIG. 11 of the first embodiment. That is, the explanation is given on the premise that the volumes of the supply tube 4 and the head 2 in the present embodiment are the same as those in the first embodiment. In the BKCL simultaneous suction of the cleaning H3 and H4, the driving amounts are set to 20000, so as to correspond to the ink filling to both the BK head 2*a* and the BK supply tube 4*a*. In the CL individual suction of the cleaning H1, the suction with the driving amount of 10000 has already been performed at the time of the BKCL simultaneous suction, and the driving amount of 30000 is required to fill the CL supply tube 4*b*. Therefore, the driving amount is set to 20000. In the CL individual suction of the cleaning H2, the suction with the driving amount of 10000 has already been performed in the BKCL simultaneous suction, and the driving amount of 60000 is required to fill the CL head 2*b* and the CL supply tube 4*b*. Therefore, the driving amount is set to 50000. In the CL individual suction of the cleaning H3, the suction with the driving amount of 20000 has already been performed in the BKCL simultaneous suction, and the driving amount of 30000 is required to fill the CL supply tube 4*b*. Therefore, the driving amount is set to 10000. In the CL individual suction of the cleaning H4, the suction with the driving amount of 20000 has already been performed in the BKCL simultaneous suction, and the driving amount of 60000 is required to fill the CL head 2*b* and the CL supply tube 4*b*. Therefore, the driving amount is set to 40000.

FIG. 17 is a diagram illustrating the amount of ink consumed in the head replacement cleaning in the present embodiment. Since FIG. 17 corresponds to the ink consumption amounts at the time of executing suction with the driving amounts illustrated in FIG. 16, there is a correlation between the driving amounts and the ink consumption amounts. First, an explanation is given of the black ink. In the BKCL simultaneous suction of the cleaning H1 and H2, the consumption amounts are set to 50 g for the ink filling to the BK supply tube 4*a*. In the BKCL simultaneous suction of the cleaning H3 and H4, the ink consumption amounts are set to 100 g for the ink filling to both the BK head 2*a* and the BK supply tube 4*a*. Next, an explanation is given of the chromatic color inks. In the CL individual suction of the cleaning H1, the suction with the ink consumption amount of 50 has been performed in the BKCL simultaneous suction, and the ink consumption amount of 150 is required to fill the CL supply tube 4*b*. Therefore, the ink consumption amount is set to 100 g. In the CL individual suction of the cleaning H2, the suction with the ink consumption amount of 50 has been performed in the BKCL simultaneous suction, and the ink consumption amount of 300 g is required to fill the CL head 2*b* and the CL supply tube 4*b*. Therefore, the ink consumption amount is set to 250 g. In the CL individual suction of the cleaning H3, the suction with the ink consumption amount of 100 g has been performed in the BKCL simultaneous suction, and the ink consumption amount of 150 is required to fill the CL supply tube 4*b*. Therefore, the ink consumption amount is set to 50 g. In the CL individual suction of the cleaning H4, the suction with the ink consumption amount of 100 g has been performed in the BKCL simultaneous suction, and the ink consumption amount of 300 g is required to fill the CL head 2*b* and the CL supply tube 4*b*. Therefore, the ink consumption amount is set to 200 g.

Figure 18:
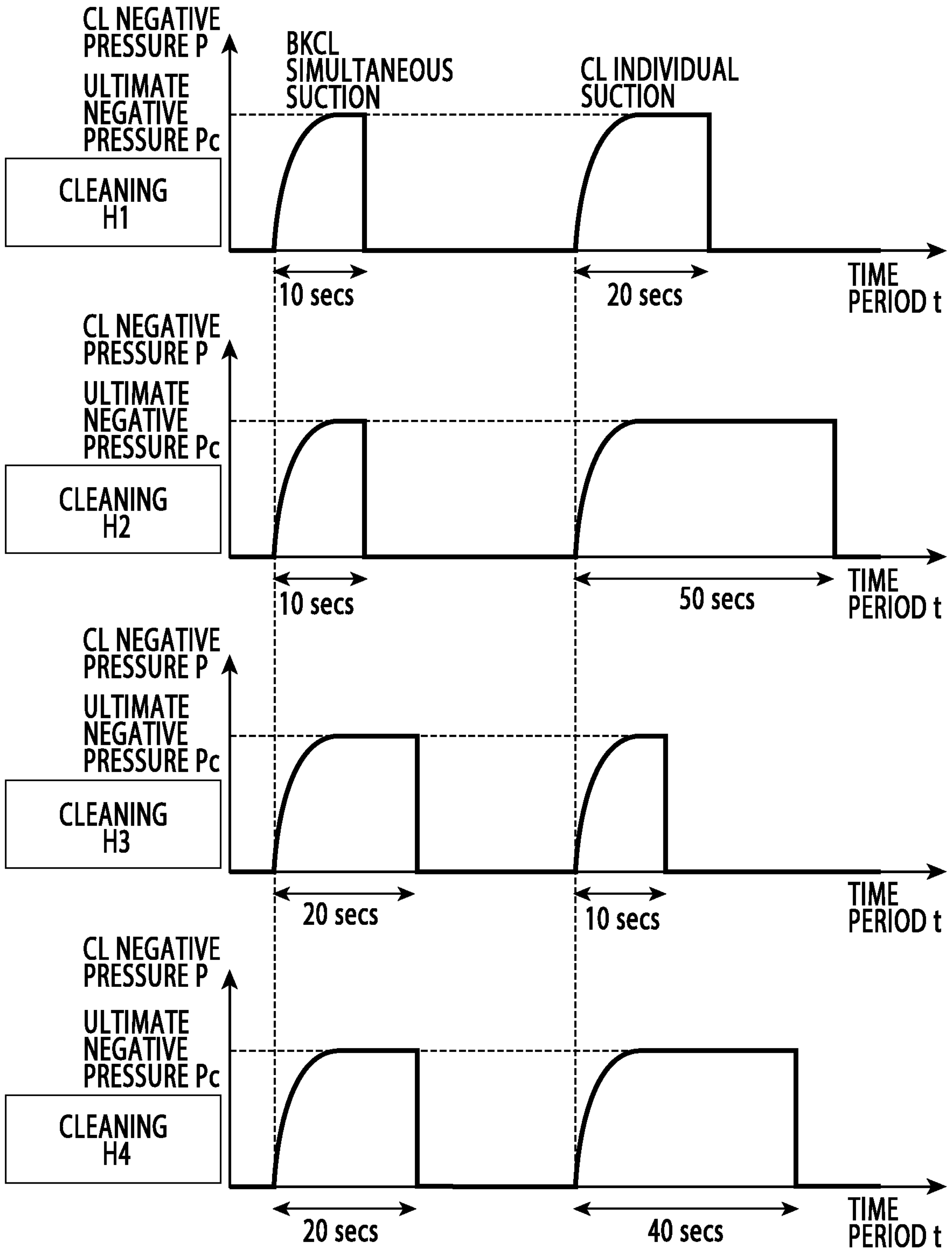
FIG. 18 is a schematic diagram of negative pressure profiled during the head replacement cleaning.

FIG. 18 is a schematic diagram of the negative pressure profiles in a state where the CL head 2*b* is capped during the head replacement cleaning in the present embodiment. Since the suction is performed twice, i.e., the BKCL simultaneous suction and the CL individual suction, the negative pressure waveform has two peaks. Since the driving speeds of the cleaning H1, H2, H3, and H4 are constant at 1000, there is no difference in the ultimate negative pressures. Since there is a correlation between the driving amount and the driving time period, the driving time period becomes shorter with decrease in driving amount, as illustrated in FIG. 18.

As explained above, also according to the present embodiment, it is possible to appropriately perform the suction recovery operation at the time of replacing a printing head. Further, in the present embodiment, since the CL head 2*b* is also suctioned at the time of the BKCL simultaneous suction, it is possible to reduce the driving amount of the CL individual suction. Therefore, the time period required for head replacement cleaning can be shortened.

Third Embodiment

In the example explained in the first embodiment, in a case where the head 2 is detached from the carriage 3, both the BK head 2*a* and the CL head 2*b* are simultaneously released to the atmosphere. In the example to be explained in the present embodiment, in a case where only the BK head 2*a* is detached from the carriage 3, only the BK head 2*a* is released to the atmosphere, and, in a case where only the CL head 2*b* is detached from the carriage 3, only the CL head 2*b* is released to the atmosphere. Since the basic configuration of the apparatus and the head replacement sequence are the same as the example explained in the first embodiment, the explanation thereof is omitted here. Hereinafter, an explanation is given mainly of the points different from the first embodiment.

Figures 19, 19A:
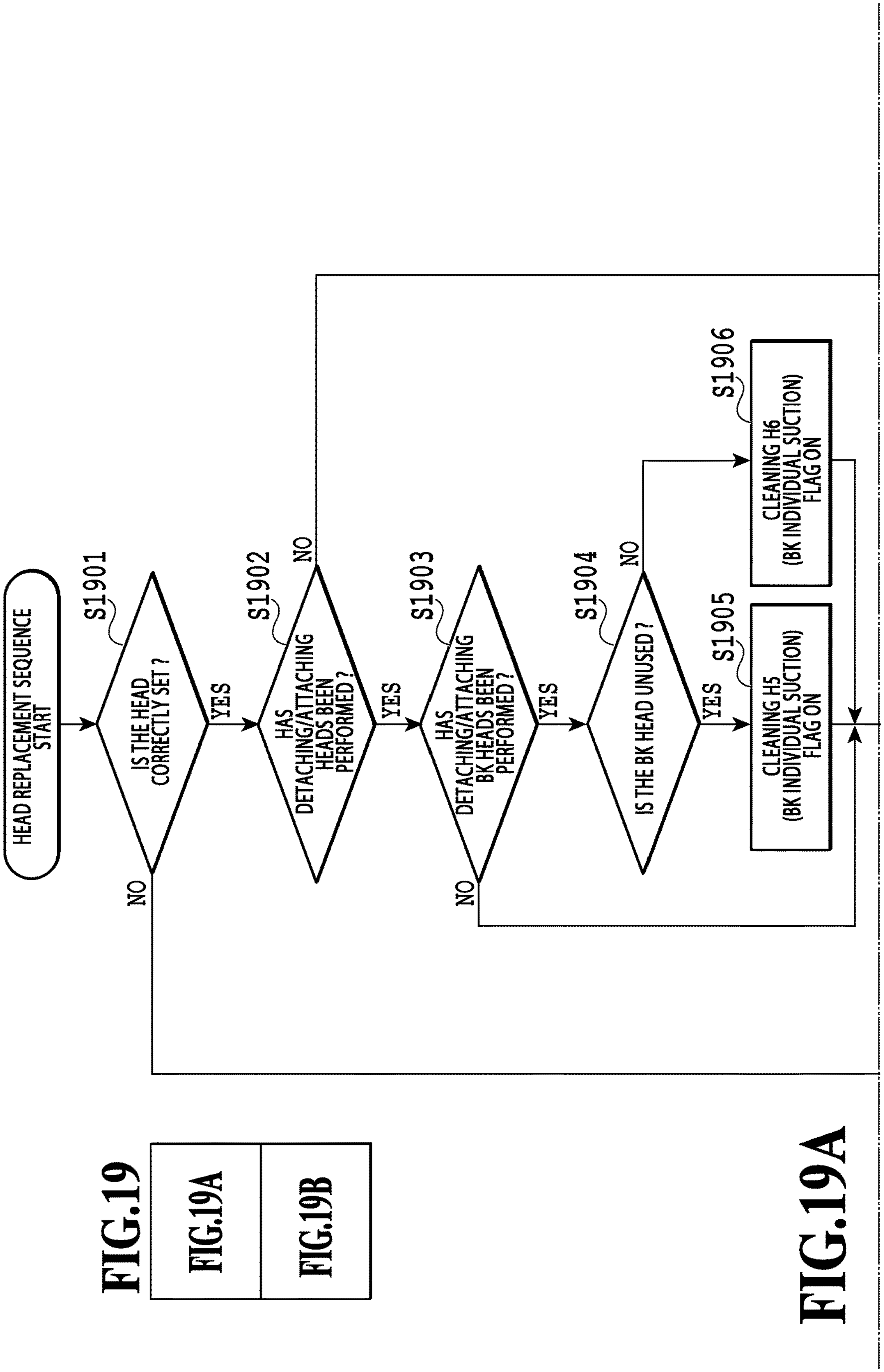
FIG. 19 is a diagram showing the relationship of FIGS. 19A and 19B.
FIGS. 19A and 19B are totally a flowchart illustrating a sequence in head replacement.
Figure 19B:
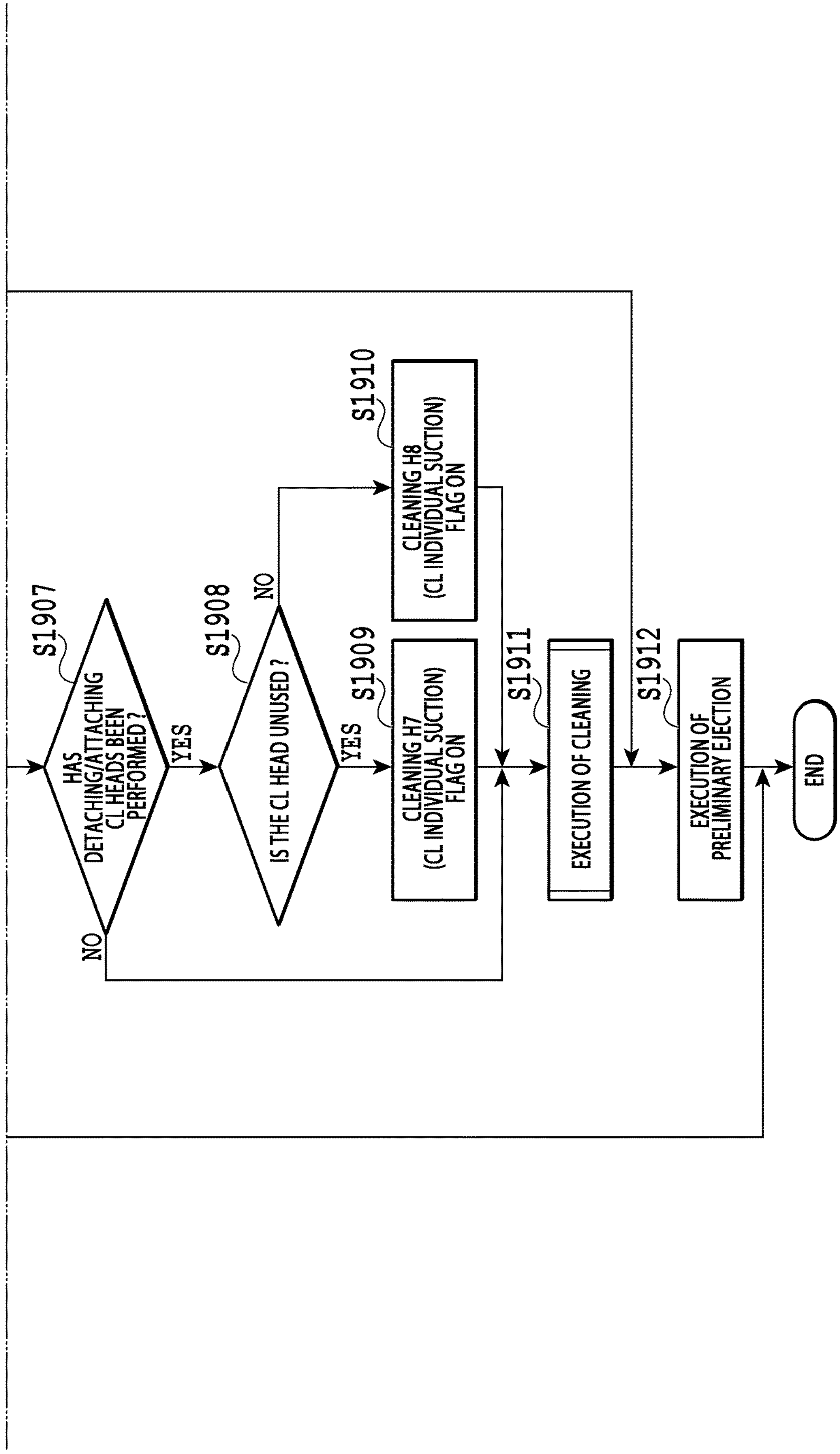

FIGS. 19A and 19B are totally a flowchart illustrating the sequence at the time of head replacement in the present embodiment. The processes of S1901 and S1902 are the same processes as S801 and S802 of FIG. 8A explained in the first embodiment. In S1903, the control circuit 4000 determines whether detaching/attaching the BK heads 2*a* has been performed. In a case where it is determined that detaching/attaching the BK heads 2*a* has not been performed, the processing proceeds to S1907. In a case where it is determined that detaching/attaching the BK heads 2*a* has been performed, the processing proceeds to S1904.

In S1904, the control circuit 4000 determines whether the attached BK head 2*a* is unused or has been used by checking the history of writing to the non-volatile memory in the BK head 2*a*. If the BK head 2*a* is unused, the processing proceeds to S1905, so that a flag of the cleaning H5 is set, and then the processing proceeds to S1907. If the BK head 2*a* has been used, the processing proceeds to S1906, so that a flag of the cleaning H6 is set, and then the processing proceeds to S1907.

In S1907, the control circuit 4000 determines whether detaching/attaching the CL heads 2*b* has been performed. In a case where it is determined that detaching/attaching the CL heads 2*b* has not been performed, the processing proceeds to S1911. In a case where it is determined that detaching/attaching the CL heads 2*b* has been performed, the processing proceeds to S1908. In S1908, the control circuit 4000 determines whether the attached CL head 2*b* is unused or has been used by checking the history of writing to the non-volatile memory in the CL head 2*b*. If the CL head 2*b* is unused, the processing proceeds to S1909, so that a flag of the cleaning H7 is set, and then the processing proceeds to S1911. If the CL head 2*b* has been used, the processing proceeds to S1910, so that a flag of the cleaning H8 is set, and then the processing proceeds to S1911.

In S1911, the control circuit 4000 executes the cleaning according to the flag which is set in S1905, S1906, S1909, or S1910. Details are described hereinafter. Next, in S1912, the control circuit 4000 executes preliminary ejection as necessary. The reason for executing preliminary ejection in a case where it is determined in S1902 that detaching/attaching the heads has not been performed (No) is as explained in the first embodiment. In the present embodiment, in a case where detaching/attaching either the BK heads 2*a* or the CL heads 2*b* has been performed, the suction recovery is not performed for the other head. However, as explained in the first embodiment, since the head has moved to the standby position, the ejection ports are exposed to the air. Therefore, in a case where the processing proceeds to S1911 and then to S1912, preliminary ejection is performed for the head that is not subject to the cleaning executed in S1911. Note that, in a case where the cleaning is executed for both the BK head 2*a* and the CL head 2*b* in S1911, the process of preliminary ejection in S1912 may be skipped.

Figure 20:
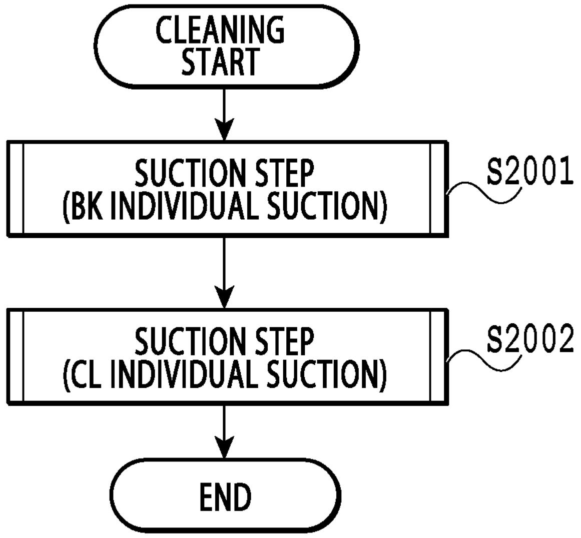
FIG. 20 is a flowchart illustrating a cleaning sequence.

FIG. 20 is a flowchart illustrating the cleaning sequence in the present embodiment. As the suction methods of the present embodiment, there are two types, i.e., BK individual suction and CL individual suction. First, in S2001, the control circuit 4000 executes the BK individual suction according to the flag which is set in S1905 or S1906. Note that, in a case where the flag is not set in S1905 or S1906, the processing of S2001 is skipped. Next, in S2002, the control circuit 4000 executes the CL individual suction according to the flag which is set in S1909 or S1910. Note that, in a case where the flag is not set in S1909 or S1910, the processing of S2002 is skipped.

FIG. 21 is a diagram illustrating suction parameters for head replacement cleaning in the present embodiment. It is assumed that the driving amounts required for filling the respective heads 2 and respective supply tubes 4 are the same as the example explained in the first embodiment. The cleaning H5 is cleaning performed for the ink filling to the BK supply tube 4*a*, and the driving amount is set to 10000. The cleaning H6 is cleaning for the ink filling to both the BK head 2*a* and the BK supply tube 4*a*, and the driving amount is set to 20000. The cleaning H7 is cleaning for the ink filling to the CL supply tube 4*b*, and the driving amount is set to 30000. The cleaning H8 is cleaning for the ink filling to both the CL head 2*b* and the CL supply tube 4*b*, and the driving amount is set to 60000.

FIG. 22 is a diagram illustrating the amounts of ink consumed in head replacement cleaning in the present embodiment. FIG. 22 shows the amounts of ink consumed in execution of suction with the driving amounts and driving speeds illustrated in FIG. 21. Further, since the driving speed is constant, the consumption amounts of ink vary according to the driving amounts in the present configuration. 50 g is set as the amount of ink consumed in the BK individual suction of the cleaning H5, and 100 g is set as the amount of ink consumed in the BK individual suction of the cleaning H6, respectively. Further, 150 g is set as the amount of ink consumed in the CL individual suction of the cleaning H5, and 300 g is set as the amount of ink consumed in the CL individual suction of the cleaning H6, respectively.

Figure 23:
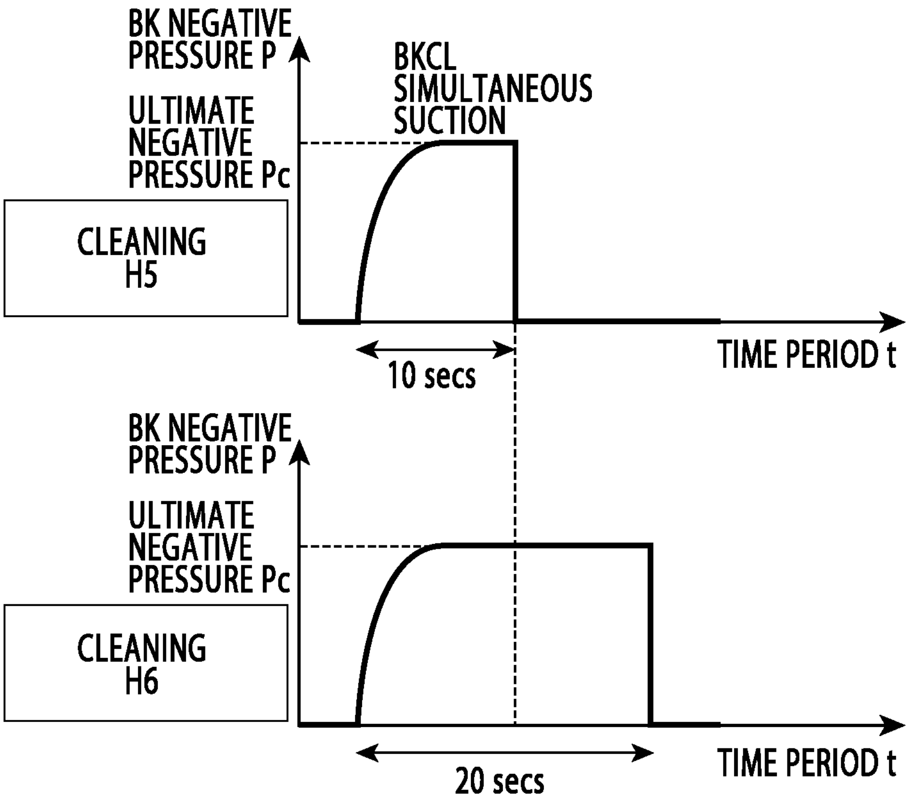
FIG. 23 is a schematic diagram of negative pressure profiles during the head replacement cleaning.

FIG. 23 is a schematic diagram of the negative pressure profiles in a state where the BK head 2*a* is capped during the head replacement cleaning in the present embodiment. Since the driving speeds of the cleaning H5 and H6 are constant at 1000, there is no difference in the ultimate negative pressures. Since the cleaning H5 for the BK head 2*a* requires a smaller driving amount than the cleaning H6, the driving time period is short.

Figure 24:
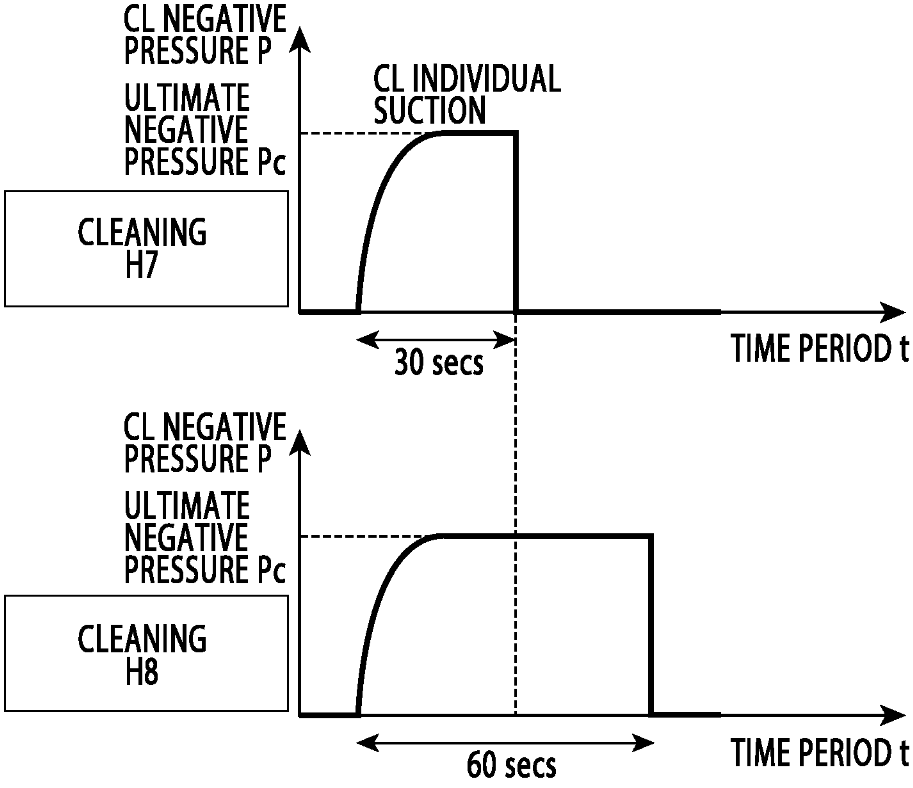
FIG. 24 is a schematic diagram of negative pressure profiles during the head replacement cleaning.

FIG. 24 is a schematic diagram of the negative pressure profiles in a state where the CL head 2*b* is capped during the head replacement cleaning in the present embodiment. Since the driving speeds of the cleaning H7 and H8 are constant at 1000, there is no difference in the ultimate negative pressures. Since the cleaning H7 for the CL head 2*b* requires a smaller driving amount than the cleaning H8, the driving time period is short.

Other Embodiments

Although the explanations in the above-described embodiments are given of the example in which information on the usage history of a head is obtained based on the presence or absence of writing to the non-volatile memory in the head, there is not a limitation as such. It is also possible that suction history is configured to be written in a non-volatile memory in a head, so that information on the usage history of a head may be obtained based on the information on the suction history. Further, whether a head is unused or has been used may be changed according to the presence or absence of writing in a fuse ROM in the head. Further, it is also possible that the presence or absence of usage of a heater board in a head is checked in a non-volatile memory in the head and obtained as the information on a usage history. Further, having been used or being unused may be determined by obtaining information on a usage history from, not only the above-described information, but also multiple pieces of information.

Further, although the explanations in the above-described embodiments are given of the example in which the driving speed of the suction pump is constant, it is also possible that the driving speed of the suction pump is changed based on the usage history of the head.

Further, although the explanations in the above-described embodiments are given of the form in which the pump is a suction pump, it is also possible to use a pressure pump, for example, as long as a configuration capable of discharging ink to the outside of the head is ensured.

Further, although the explanations in the above-described embodiments are given of the example in which the head 2 is what is termed as a serial-type head that performs printing while scanning, it is also possible to use what is termed as a line-type head that is equipped with ejection ports corresponding to the width direction of the print medium so as to perform printing without scanning.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-140656, filed Sep. 5, 2022, which is hereby incorporated by reference wherein in its entirety.

What is claimed is:

1. A printing apparatus comprising:

a mounting unit configured so that a head that ejects ink can be mounted in a replaceable manner;

a cap configured to cover an ejection port of the head;

a tank configured to contain ink to be supplied to the head via a tube;

a pump configured to discharge ink to an outside of the head;

a detection unit configured to detect that the head mounted on the mounting unit has been replaced;

an obtainment unit configured to obtain information of a usage history which indicates whether or not the head mounted as a replacement has been used; and a control unit configured to control a discharge operation, which is performed by the pump after head replacement, to be changed based on the information of the usage history, wherein the printing apparatus is configured to be capable of ejecting ink with a first head and a second head, which is different from the first head, being attached as the head, wherein the control unit is configured to change a driving amount of the pump driven for each of the first head and the second head, based on information of a usage history of each of the first head and the second head, wherein the first head corresponds to a head that ejects ink of one color, and the second head corresponds to a head that ejects ink of a plurality of colors, wherein the discharge operation performed by driving the pump corresponds to an operation of suctioning ink from the head via the cap, and wherein, if the information of the usage history of the first head and the information of the usage history of the second head are the same information, the driving amount of the pump is greater in a case of suctioning the second head than in a case of suctioning the first head.

2. The printing apparatus according to claim 1, wherein the control unit is configured to drive the pump at a first driving amount in a case where the information of the usage history indicates that the head mounted as the replacement is unused, and wherein the control unit is configured to drive the pump at a second driving amount, which is greater than the first driving amount, in a case where the information of the usage history indicates that the head mounted as the replacement has been used.

3. The printing apparatus according to claim 2, wherein the first driving amount corresponds to a driving amount for supplying ink from the tank to the tube, and the second driving amount corresponds to a driving amount for supplying the ink from the tank to both the head and the tube.

4. The printing apparatus according to claim 1, wherein, in a case where the first head or the second head is replaced, the printing apparatus is configured to suction the first head and the second head, and wherein the control unit is configured to change the driving amount of the pump driven for each of the first head and the second head, based on a combination of information of respective usage histories of the first head and the second head.

5. The printing apparatus according to claim 1, wherein, in a case where the detection unit detects that at least one of the first head and the second head is replaced, the control unit is configured to change the driving amount of the pump driven for the head whose replacement has been detected, based on information of a usage history of the head whose replacement has been detected, and change the driving amount of the pump driven for the head whose replacement has not been detected, based on information of a usage history whose replacement has not been detected.

6. The printing apparatus according to claim 1, wherein the pump is configured to be capable of suctioning either the first head or the second head in the operation of suctioning ink from the head via the cap.

7. The printing apparatus according to claim 1, wherein the pump is configured to be capable of suctioning both the first head and the second head in the operation of suctioning ink from the head via the cap.

8. The printing apparatus according to claim 1, wherein, in a case where the first head or the second head is replaced, the printing apparatus is configured to suction the head mounted as the replacement and not suction the head that is not replaced.

9. The printing apparatus according to claim 1, wherein the obtainment unit is configured to obtain the information of the usage history of the head by referring to a non-volatile memory included in the head.

10. The printing apparatus according to claim 9, wherein, if the non-volatile memory contains information that is written in a case where the head is used, the control unit is configured to determine that the head has been used.

11. The printing apparatus according to claim 9, wherein, as the information of the usage history, the obtainment unit is configured to obtain information which indicates a usage history of a heater board and is stored in the non-volatile memory included in the head.

12. The printing apparatus according to claim 1, wherein the obtainment unit is configured to obtain the information of the usage history by referring to a fuse read-only memory (ROM) included in the head.

13. A method for a printing apparatus that includes a mounting unit configured so that a head that ejects ink can be mounted in a replaceable manner, a cap configured to cover an ejection port of the head, a tank configured to contain ink to be supplied to the head via a tube, and a pump configured to discharge ink to an outside of the head, the method comprising:

detecting that the head mounted on the mounting unit has been replaced;

obtaining information of a usage history which indicates whether or not the head mounted as a replacement has been used;

controlling a discharge operation, which is performed by the pump after head replacement, to be changed based on the information of the usage history, wherein the printing apparatus is configured to be capable of ejecting ink with a first head and a second head, which is different from the first head, being attached as the head; and changing a driving amount of the pump driven for each of the first head and the second head, based on information of a usage history of each of the first head and the second head, wherein the first head corresponds to a head that ejects ink of one color, and the second head corresponds to a head that ejects ink of a plurality of colors, wherein the discharge operation performed by driving the pump corresponds to an operation of suctioning ink from the head via the cap, and wherein, if the information of the usage history of the first head and the information of the usage history of the second head are the same information, the driving amount of the pump is greater in a case of suctioning the second head than in a case of suctioning the first head.

* * * * *